United States Patent
Kuroda et al.

(10) Patent No.: US 9,285,949 B2
(45) Date of Patent: Mar. 15, 2016

(54) DATA PROCESSING SYSTEM, METHOD AND PROGRAM PRODUCT OF CREATING PROGRAM INFORMATION, AND PROGRAM INFORMATION DISPLAY SYSTEM

(71) Applicant: Kabushiki Kaisha Toshiba, Minato-ku (JP)

(72) Inventors: Akira Kuroda, Yokohama (JP);
Hidenori Matsuzaki, Fuchu (JP);
Mayuko Koezuka, Ota-ku (JP);
Nobuaki Tojo, Tachikawa (JP); Kenji Funaoka, Kawasaki (JP); Hironori Uetani, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/333,778

(22) Filed: Jul. 17, 2014

(65) Prior Publication Data

US 2015/0026702 A1    Jan. 22, 2015

(30) Foreign Application Priority Data

Jul. 22, 2013 (JP) .................................. 2013-152137
Jul. 14, 2014 (JP) ................................. 2014-144506

(51) Int. Cl.
*G06F 3/0481* (2013.01)
*G06F 9/54* (2006.01)
*G06F 11/34* (2006.01)

(52) U.S. Cl.
CPC .............. *G06F 3/0481* (2013.01); *G06F 9/542* (2013.01); *G06F 11/3466* (2013.01)

(58) Field of Classification Search
CPC .... G06F 3/0481; G06F 9/542; G06F 11/3466
See application file for complete search history.

(56) References Cited

U.S. PATENT DOCUMENTS

| | | | |
|---|---|---|---|
| 5,872,909 A * | 2/1999 | Wilner et al. .............. | 714/38.12 |
| 7,698,686 B2 | 4/2010 | Carroll et al. | |
| 2002/0129339 A1* | 9/2002 | Callahan, II ........ | G06F 11/3404 717/127 |
| 2003/0151627 A1* | 8/2003 | Meserth ................ | G06F 3/0481 715/772 |
| 2004/0064293 A1* | 4/2004 | Hamilton ............ | G06F 11/3409 702/182 |
| 2005/0132121 A1* | 6/2005 | Robinson ...................... | 711/100 |
| 2013/0218844 A1* | 8/2013 | Gooding et al. .............. | 707/684 |

(Continued)

*Primary Examiner* — Charles E Anya
(74) *Attorney, Agent, or Firm* — Oblon, McClelland, Maier & Neustadt, L.L.P.

(57) ABSTRACT

A system according to embodiments comprises first to third acquisition units and first and second creation units. The first acquisition unit may acquire event information including timeline information about an execution time or an execution order of at least one event. The second acquisition unit may acquire axis information including first axis information for deciding an first coordinate axis of a timeline about the execution time or the execution order of the event. The third acquisition unit may acquire event specific information for specifying the event information. The first creation unit may create a first axis object representing the first coordinate axis based on the axis information. The second creation unit may, for every event information specified by the event specific information, decide a coordinate of the event on the first coordinate axis based on the timeline information and the first axis information, decide a starting point coordinate and an ending point coordinate of an area corresponding to the event specified by the event information based on a decided coordinate of the event, and create an area object representing the area defined by the starting point coordinate and the ending point coordinate.

12 Claims, 19 Drawing Sheets

(56) References Cited

U.S. PATENT DOCUMENTS

2013/0290934 A1* 10/2013 Simon ................. G06F 11/3636
717/125

2014/0365927 A1* 12/2014 Sakai ................... G06F 3/0488
715/764

* cited by examiner

FIG.1

```
                  101 function0(){
  taskA;              }102
//LoopA
    for(i=0; i<3;i++){
      function1();
    }
  taskB;              }103
  taskC;              }104
}
function1(){
  taskD;              }105
  function2();
}
function2(){
  taskE;              }106
}
```

0,0,2000,core0,function:taskA }602
1,2000,3000,core1,function0:LoopA:iteration:function1:taskD,1 }603
2,3000,4000,core2,function0:LoopA:iteration:function1:function2:taskE,1 }604
3,4000,5000,core3,function0:LoopA:iteration:function1:taskD,2 }605
4,5000,6000,core4,function0:LoopA:iteration:function1:function2:taskE,2 }606
5,6000,7000,core20,function0:LoopA:iteration:function1:taskD,3 }607
6,7000,8000,core21,function0:LoopA:iteration:function1:function2:taskE,3 }608
7,8000,10000,core0,function0:taskB }609
8,10000,10010,core0,function0:taskC }610

1,2 }702
core0,0,DISPLAY }703
core1,100,DISPLAY }704
core2,200,DISPLAY }705
core3,300,DISPLAY }706
core4,400,DISPLAY }707
core5,500,DISPLAY }708
core6,600,DISPLAY }709
core7,700,DISPLAY }710
core8,800,DISPLAY }711

| | |
|---|---|
| EVENT BELONGING TO LoopA | }802 |
| EVENT BELONGING TO iteration1 | }803 |
| EVENT BELONGING TO iteration2 | }804 |
| EVENT BELONGING TO iteration3 | }805 |
| EVENT BELONGING TO function0 | }806 |
| EVENT BELONGING TO function1 | }807 |
| EVENT BELONGING TO function2 | }808 |
| iteration1 EVENT | }809 |
| iteration2 EVENT | }810 |
| iteration3 EVENT | }811 |
| function0 EVENT | }812 |
| function1 EVENT | }813 |
| function2 EVENT | }814 |
| EVENT WITH EXECUTION TERM LESS THAN 1000 | }815 |
| EVENT WITH EXECUTION TERM NOT LESS THAN 1000 | }816 |

EVENT BELONGING TO LoopA      }1002
EVENT BELONGING TO iteration1 }1003
EVENT BELONGING TO iteration2 }1004
EVENT BELONGING TO iteration3 }1005

EVENT BELONGING TO LoopA,2000,8000       }1102
EVENT BELONGING TO iteration1,2000,4000  }1103
EVENT BELONGING TO iteration2,4000,6000  }1104
EVENT BELONGING TO iteration3,6000,8000  }1105

```
function0(){
  //LoopA
  for(i=0; i<3;i++){
    //LoopB
    for(j=0; j<3;j++){
      taskA;         }1304 }1303 }1302
    }
  }
}
```

0,1,1,9,1800,function0:LoopA,0,0                                    }1702
1,1,1,3,600,function0:LoopA:iteration:LoopB,1,0                     }1703
2,1,1,1,100,function0:LoopA:iteration:LoopB:iteration:taskA,1,1     }1704
3,2,2,2,200,function0:LoopA:iteration:LoopB:iteration:taskA,1,2     }1705
4,3,3,3,300,function0:LoopA:iteration:LoopB:iteration:taskA,1,3     }1706
5,2,4,6,600,function0:LoopA:iteration:LoopB,2,0                     }1707
6,4,4,4,100,function0:LoopA:iteration:LoopB:iteration:taskA,2,1     }1708
7,5,5,5,200,function0:LoopA:iteration:LoopB:iteration:taskA,2,2     }1709
8,6,6,6,300,function0:LoopA:iteration:LoopB:iteration:taskA,2,3     }1710
9,3,7,9,600,function0:LoopA:iteration:LoopB,3,0                     }1711
10,7,7,7,100,function0:LoopA:iteration:LoopB:iteration:taskA,3,1    }1712
11,8,8,8,200,function0:LoopA:iteration:LoopB:iteration:taskA,3,2    }1713
12,9,9,9,300,function0:LoopA:iteration:LoopB:iteration:taskA,3,3    }1714

1,1                 }1802
0,0,DISPLAY         }1803
100,100,DISPLAY     }1804
500,500,DISPLAY     }1805
1000,1000,DISPLAY   }1806
1500,1500,DISPLAY   }1807
2000,2000,DISPLAY   }1808

| | |
|---|---|
| EVENT BELONGING TO LoopA | }1902 |
| iteration EVENT OF LoopA | }1903 |
| EVENT BELONGING TO iteration1 OF LoopA | }1904 |
| EVENT BELONGING TO iteration2 OF LoopA | }1905 |
| EVENT BELONGING TO iteration3 OF LoopA | }1906 |
| EVENT BELONGING TO iteration1 OF LoopB | }1907 |
| EVENT BELONGING TO iteration2 OF LoopB | }1908 |
| EVENT BELONGING TO iteration3 OF LoopB | }1909 |
| EVENT WITH EXECUTION TERM LESS THAN 1000 | }1910 |
| EVENT WITH EXECUTION TERM NOT LESS THAN 1000 | }1911 |

| | | |
|---|---|---|
| ☐ | EVENT BELONGING TO LoopA | }2002 |
| ☐ | iteration EVENT OF LoopA | }2003 |
| ☐ | EVENT BELONGING TO iteration1 OF LoopA | }2004 |
| ☐ | EVENT BELONGING TO iteration2 OF LoopA | }2005 |
| ☐ | EVENT BELONGING TO iteration3 OF LoopA | }2006 |
| ☐ | EVENT BELONGING TO iteration1 OF LoopB | }2007 |
| ☐ | EVENT BELONGING TO iteration2 OF LoopB | }2008 |
| ☐ | EVENT BELONGING TO iteration3 OF LoopB | }2009 |
| ☐ | EVENT WITH EXECUTION TERM < 1000 | }2010 |
| ☐ | EVENT WITH EXECUTION TERM ≥ 1000 | }2011 |
| ☐ | EVENTS OF EXECUTION SEQUENCE FROM 1 TO 5 OF taskA | }2012 |

EVENT BELONGING TO LoopA  }2102
iteration EVENT OF LoopA    }2103

EVENT BELONGING TO LoopA,1,9   }2202
iteration1 EVENT OF LoopA,1,3   }2203
iteration2 EVENT OF LoopA,4,6   }2204
iteration3 EVENT OF LoopA,6,9   }2205

0,1,1,9,1800,function0:LoopA,0,0 }2702
1,1,1,3,1000,function0:LoopA:iteration:LoopB,1,0 }2703
2,1,1,1,500,function0:LoopA:iteration:LoopB:iteration:taskA,1,1 }2704
3,2,2,2,200,function0:LoopA:iteration:LoopB:iteration:taskA,1,2 }2705
4,3,3,3,300,function0:LoopA:iteration:LoopB:iteration:taskA,1,3 }2706
5,2,4,6,300,function0:LoopA:iteration:LoopB,2,0 }2707
6,4,4,4,100,function0:LoopA:iteration:LoopB:iteration:taskA,2,1 }2708
7,5,5,5,100,function0:LoopA:iteration:LoopB:iteration:taskA,2,2 }2709
8,6,6,6,100,function0:LoopA:iteration:LoopB:iteration:taskA,2,3 }2710
9,3,7,9,500,function0:LoopA:iteration:LoopB,3,0 }2711
10,7,7,7,100,function0:LoopA:iteration:LoopB:iteration:taskA,3,1 }2712
11,8,8,8,100,function0:LoopA:iteration:LoopB:iteration:taskA,3,2 }2713
12,9,9,9,300,function0:LoopA:iteration:LoopB:iteration:taskA,3,3 }2714

1,1 }2802
0,0,DISPLAY }2803
EVENT EXECUTION TERM 100,100,DISPLAY }2804
EVENT EXECUTION TERM 500,500,DISPLAY }2805
EVENT EXECUTION TERM 1000,1000,DISPLAY }2806
EVENT EXECUTION TERM 1500,1500,DISPLAY }2807
EVENT EXECUTION TERM 2000,2000,DISPLAY }2808
AREA EXECUTION TERM 0,0,DISPLAY }2809
AREA EXECUTION TERM 500,300,DISPLAY }2810
AREA EXECUTION TERM 1000,600,DISPLAY }2811

EVENT BELONGING TO iteration1 OF LoopA   }2902
EVENT BELONGING TO iteration2 OF LoopA   }2903
EVENT BELONGING TO iteration3 OF LoopA   }2904

EVENT BELONGING TO iteration1 OF LoopA,1,3,1000   }3002
EVENT BELONGING TO iteration2 OF LoopA,4,6,300    }3003
EVENT BELONGING TO iteration3 OF LoopA,7,9,500    }3004

DATA PROCESSING SYSTEM, METHOD AND PROGRAM PRODUCT OF CREATING PROGRAM INFORMATION, AND PROGRAM INFORMATION DISPLAY SYSTEM

CROSS-REFERENCE TO RELATED APPLICATION(S)

This application is based upon and claims the benefit of priority from the Japanese Patent Applications No. 2013-152137, filed on Jul. 22, 2013 and No. 2014-144506, filed on Jul. 14, 2014; the entire contents of which are incorporated herein by reference.

FIELD

Embodiments described herein relate generally to a data processing system, a method and a program product of creating program information, and a program information display system.

BACKGROUND

Conventionally, there is a technique for displaying program execution status in which events and thread objects representing threads executed based on execution trace of program are displayed on a plane defined by a time axis and an axis of thread. This technique provides a region for displaying activity of the whole program execution status and a region for displaying detail execution status in a specific range using the thread axis and the time axis, and provides function for assigning the specific range from the region for displaying the whole execution status. Accordingly, it is possible to display detail information about a specific part from the whole program execution status interactively.

When a programmer executes operation check, performance optimization, and so forth, by displaying program execution status for developing program, although the program execution status is displayed on a display device, a display region for the execution status is limited to a display size of the display device. Therefore, when there are massive events for displaying on the region for displaying detail program execution status, it may be difficult to let a user understand the detail program execution status. For example, due to the limitation of display size of the display device, it may be impossible to display information about all events at one instance. Furthermore, when the information about all the events is displayed at one instance, sizes of objects representing the events become extremely small so that the events become not discernible to the eye.

BRIEF DESCRIPTION OF THE DRAWINGS

FIG. 1 is a diagram showing an example of a program using in a first embodiment;

FIG. 6 is an illustration showing an example of event information according to the first embodiment;

FIG. 7 is an illustration showing an example of axis information according to the first embodiment;

FIG. 8 is an illustration showing an example of information about candidates of area definition conditions according to the first embodiment;

FIG. 10 is an illustration showing an example of information about area definition conditions according to the first embodiment;

FIG. 11 is an illustration showing an example of region information according to the first embodiment;

FIG. 17 is an illustration showing an example of event information according to the second embodiment;

FIG. 18 is an illustration showing an example of axis information according to the second embodiment;

FIG. 19 is an illustration showing an example of information about candidates of area definition conditions according to the second embodiment;

FIG. 20 is a diagram showing an display example of a hint object according to the second embodiment;

FIG. 21 is an illustration showing an example of information about area definition conditions according to the second embodiment;

FIG. 22 is an illustration showing an example of region information according to the second embodiment;

FIG. 27 is an illustration showing an example of event information according to a third second embodiment;

FIG. 28 is an illustration showing an example of axis information according to the third embodiment;

FIG. 29 is an illustration showing an example of information about area definition conditions according to the third embodiment;

FIG. 30 is an illustration showing an example of region information according to the third embodiment;

DETAILED DESCRIPTION

Figure 2:
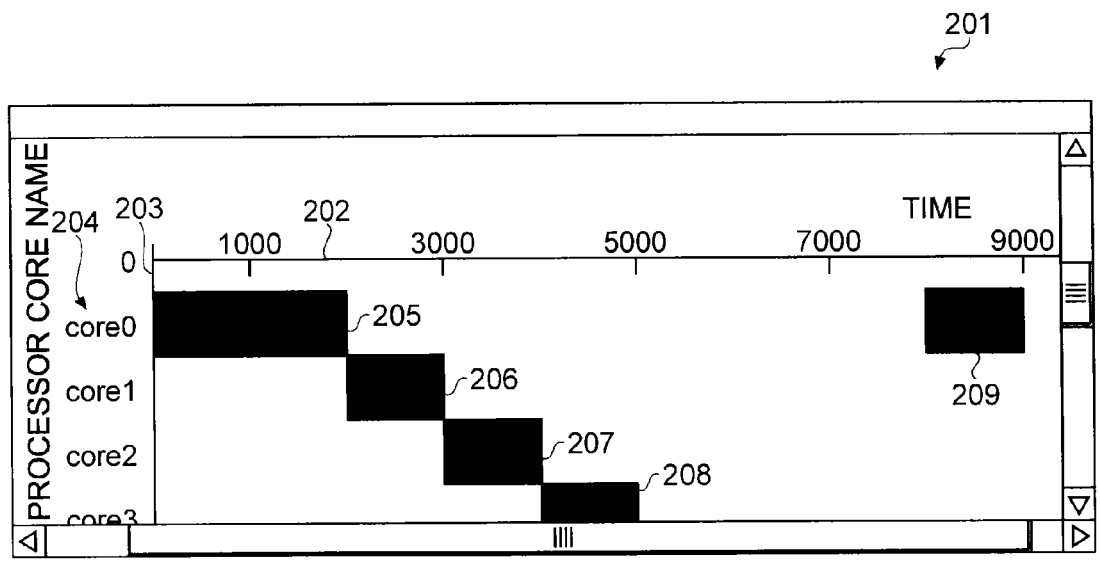
FIG. 2 is a diagram showing a display example of an execution status of the program shown in FIG. 1.

Exemplary embodiments of a data processing system, a method and a program product of creating program information, and a program information display system will be explained below in detail with reference to the accompanying drawings.

First Embodiment

Firstly, for explaining a data processing system, a method and a program product of creating program information, and a program information display system according to a first embodiment, some of definitions of terms will be explained here.

In the first embodiment, a case where an execution status when a software program 101 (hereinafter to be simply referred to as program) exampled in FIG. 1 is executed by a hardware with forty-five processor cores is displayed will be explained as an example. As shown in FIG. 1, the program 101 includes five types of events which are "taskA" 102, "taskB" 103, "taskC" 104, "taskD" 105 and "taskE" 106.

A program execution status is indications of occurrence points and transitions of events that occur will be occurred during execution of the program. A data processing system, a method and a program product of creating program information, and a program information display system are examples of a system, a method and a program product for displaying a program execution status on a coordinate system expressed by a timeline axis and an attribute axis. In the first embodiment, an axis of which component is execution time is used as the timeline axis, and an axis of which component is names of processor cores executing events is used as the attribute axis.

An event is a unit of process occurred during execution of program and process. Each event may be a structural unit of program such as function, loop, conditional branch, and so forth, and may also be a specific process such as memory access, command execution, thread creation, synchronous processing, and so forth.

A timeline axis object is an image being a scale for deciding a coordinate point of timeline. Any type of timeline axis object can be applied as long as it can be used as a scale for deciding a coordinate point of timeline. For instance, line, point, numeric character, character string, or the like, can be used as the timeline axis object.

An attribute axis object is an image being a scale for deciding a coordinate point of attribute. Any type of attribute axis object can be applied as long as it can be used as a scale for deciding a coordinate point of attribute. For instance, line, point, numeric character, character string, or the like, can be used as the attribute axis object.

An area object is an image representing an area in a direction of the timeline axis. Any area object can be applied as long as it can represent the area. For instance, line, rectangle, or the like, can be used as the area object.

An event object is an image representing an event. Any event object can be applied as long as it can represent the event. For instance, line, rectangle, or the like, can be used as the event object.

A screen size or a window size being a display device has limited region. Therefore, there is a limit to the number of elements that can be displayed on the attribute axis at one time. In the first embodiment, the attribute axis of which component is processor core names executing event is used as an axis of a display region. Thereby, the number of all the elements on the attribute axis becomes 45 which is the same number of processor cores.

Figure 3:
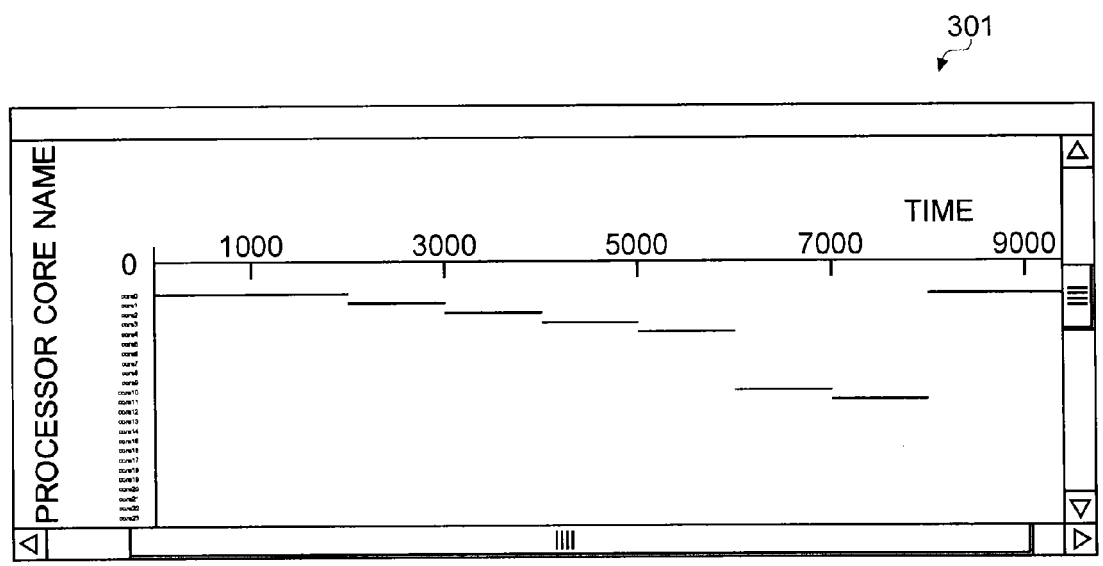
FIG. 3 is a diagram showing another display example of the execution status of the program shown in FIG. 1.

FIGS. 2 and 3 show display examples of a program execution status with a prior art. FIG. 2 is an illustration showing a display example of a case where a display size for attribute axis elements is fixed. As shown in FIG. 2, when the number of attribute axis elements 204 capable of being displayed at one time is 3, it is impossible to display all the elements of an attribute axis 203 at one time. Therefore, displayable events are events 205, 206, 207 and 209 appertaining to attribute "core0", "core1" and "core2", and as for attribute axis elements beyond attribute "core3", it is impossible to display events (e.g., events beyond an event 308) accurately. This is the same for a timeline axis 202. In such case, in the prior art, by shifting the specific range using a scroll bar, or the like, a target region is displayed. However, in a display method of a specific range using a scroll bar, or the like, there is a case where it is impossible to see undisplayed attribute axis elements.

FIG. 3 is an illustration showing a display example of a case where all attribute axis elements are displayed at one time. As shown in FIG. 3, in this case, in the prior art, the whole is displayed by deciding a display size of an attribute axis elements based on a screen size or a window size. Therefore, characters and events may be displayed in collapsed forms depending on the drawing performance, and therefore, the events may not be displayed visibly. For example, in the example shown in FIG. 3, it is difficult to obtain information of processor cores executing events.

In the first embodiment, by additionally displaying a region including one or more events, a user is made able to easily understand an execution status of massive events. In the first embodiment, a case where the region is decided based on execution term information of event information is explained as an example.

Structure

Figure 4:
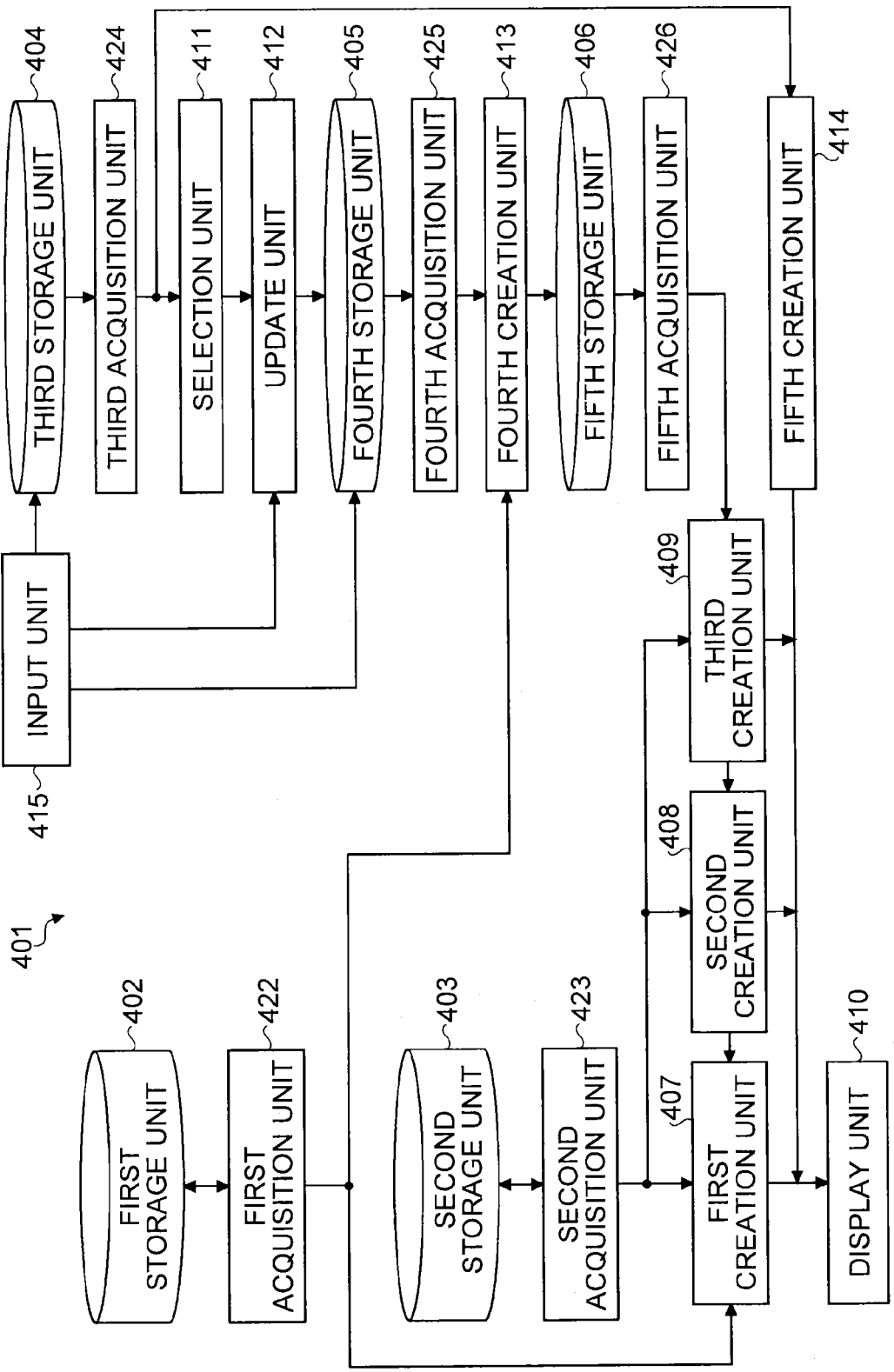
FIG. 4 is a diagram showing a configuration example of a program execution status display device according to the first embodiment.

FIG. 4 is a functional block diagram of an outline configuration of a program execution status display system 401 according to the first embodiment. The system 401 has a first acquisition unit 422, a second acquisition unit 423, a third acquisition unit 424, a fourth acquisition unit 425, a fifth acquisition unit 426, a first storage unit 402, a second storage unit 403, a third storage unit 404, a fourth storage unit 405, a fifth storage unit 406, a first creation unit 407, a second creation unit 408, a third creation unit 409, a display unit 410, a selection unit 411, an update unit 412, a fourth creation unit 413, a fifth creation unit 414, and an input unit 415. Details thereof will be described later on.

Operation

Figure 5:
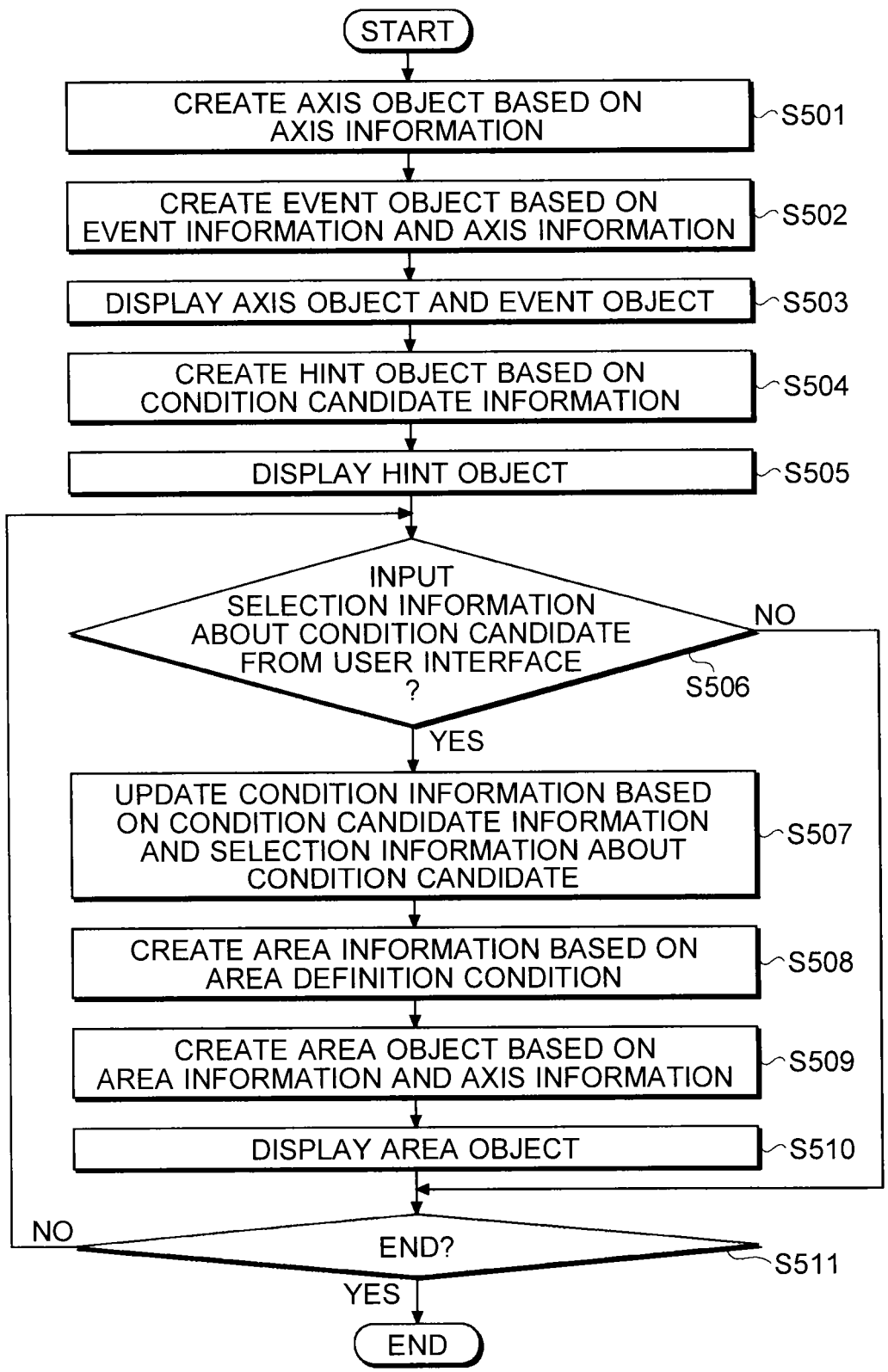
FIG. 5 is a diagram showing an operation example of the program execution status display device according to the first embodiment.

FIG. 5 is a flowchart showing an operation example of the program execution status display system 401 shown in FIG. 4. As shown in FIG. 4, in this operation, firstly, the second acquisition unit 423 acquires axis information from the second storage unit 403, and the second creation unit 408 creates axis objects based on the acquired axis information (step S501). Furthermore, the second acquisition unit 423 acquires the axis information from the second storage unit 403, the first acquisition unit 422 acquires at least one piece of event information from the first storage unit 402, and the first creation unit 407 creates event objects based on the acquired axis information and event information (step S502). Then, the display unit 410 displays the created axis object and event objects (step S503).

Next, the third acquisition unit 424 acquires at least one piece of information about candidate of area definition condition (hereinafter referred to as condition candidate information) from the third storage unit 404, and the fifth creatin unit 414 creates a hint object based on the acquired condition candidate information (step S504). Then, the display unit 410 displays the created hint object (step S505).

Next, the selection unit 411 determines whether a user inputs selection information about candidate of area definition condition using the displayed hint object or not (step S506). This input is conducted using the input unit 415, for instance. When the selection information is not inputted (step S506; NO), the system 401 progresses to the step S511. On the other hand, when the selection information is inputted (step S506; YES), the third acquisition unit 424 acquires at least one piece of condition candidate information from the third storage unit 404, the selection unit 411 creates information about area definition condition (hereinafter referred to as condition information) based on the acquired condition candidate information and the selection information about the area definition condition candidate inputted by the user, and the update unit 412 updates the condition information in the fourth storage unit 405 (step S507). Here, the condition candidate information in the third storage unit 404 is information preset by a user using the input unit 415, for instance. In step S507, the condition information in the fourth storage unit 405 can be directly updated by a user using the input unit 415, for instance. In such case, it is possible to omit the processes of display the hint object according to steps S504 to S506.

Next, the fourth acquisition unit 425 acquires the condition information from the fourth storage unit 405, and the fourth creation unit 413 creates area information based on the acquired condition information (step S508). The created area information is stored in the fifth storage unit 406.

Next, the second acquisition unit 423 acquires axis information from the second storage unit 403, the fifth acquisition unit 426 acquires the area information from the fifth storage unit 406, and the third creation unit 409 creates an area object based on the acquired axis information and area information (step S509). Then, the display unit 410 displays the created area object (step S510). After that, the system 401 determines whether this operation should be finished or not (step S511), when the operation should not be finished (step S511; NO), the system 401 returns to step S506. In this way, the steps after step S506 are executed for every change in the selection of a candidate of area definition condition. On the other hand, when it is determined that the operation should be finished (step S511; YES), the system 401 finishes the operation.

Next, each unit shown in FIG. 4 will be described in detail.

First acquisition unit and First storage unit (event information acquisition unit and event information storage unit)

The first acquisition unit 422 acquires at least one piece of event information from the first storage unit 402 on demand from the first creation unit 407 and the fourth creation unit 413, for instance. The first storage unit 402 is a storage for storing at least one piece of event information. The event information is information about event executed during execution of program, and includes at least event specific information, event timeline information and attribute information.

Example of Event Information

The event information will be explained using a case of executing the program 101 shown in FIG. 1. The program 101 is executed as follow. Firstly, "taskA" 102 is executed at a processor core "core0" from a time "0" till a time "2000". Then, "taskD" 105 is executed at a processor core "core1" from the time "2000" till a time "3000". Then, "taskE" 106 is executed at a processor core "core2" from the time "3000" till a time "4000". Then, "taskD" 205 is executed at a processor core "core3" from the time "3000" till a time "5000". Then, "taskE" 106 is executed at a processor core "core4" from the time "5000" till a time "6000". Then, "taskD" 105 is executed at a processor core "core20" from the time "6000" till a time "7000". Then, "taskE" 106 is executed at a processor core "core21" from the time "7000" till a time "8000". Then, "taskB" 103 is executed at the processor core "core0" from the time "8000" till a time "10000". Finally, "taskC" 104 is executed at the processor core "core0" from the time "10000" till a time "10010".

The event information about program described above is managed using an event information list in which pieces of individual event information are listed. FIG. 6 shows an example of an event information list 601 when the program shown in FIG. 1 is executed. As shown in FIG. 6, each event information 602 to 610 in the event information list 601 includes an unique ID which is event specific information assigned in execution sequence, execution term information indicated by an execution start time and an execution ending time of the event timeline information, and a processor core name executing event, program structure information and iteration information indicating an iteration count of the attribute information. In the example shown in FIG. 6, the event information list 601 stores nine pieces of event information, and a single line indicates one piece of event information. For example, the event information 603 has, in order of the unique ID in event specific information, the execution start time in execution term information, the execution ending time in execution term information, the executing processor core in attribute information, the program structure information in attribute information and the iteration information in attribute information, "1", "2000", "3000", "core1", "function1:LoopA:iteration:taskA" and "1". Regarding an event corresponding to the event information 603, the unique ID is "1", and the event is executed at the processor core "core1" during the execution start time "2000" to the execution ending time "3000". An event corresponding to the event information 603 is indicated by "taskA" in "iteration" in "LoopA" in "function1" on a program structure, and it is an event executed at a first iteration of "LoopA".

The event specific information is information for specifying a certain event from a plurality of pieces of event information included in the first storage unit 402, and for example, it may be an event unique name or an even unique ID.

The event timeline information is timeline information, and for example, it may be an execution term information or a timeline sequence.

The execution term information is information, and for example, it may be information including at least an execution start time and an execution term, at least an execution start time and an execution ending time or at least an execution term and an execution ending time, or be an execution start time or an execution ending time of event.

The execution start time, the execution ending time and the execution term are term information, and for instance, it may be a processor time in program execution, or term information generated based on the processor time.

The event timeline sequence information is information indicating a sequence of executing events, and for instance, it may be sequence information with respect to execution of the whole program, or sequence information on the program structure with iterated execution such as in-iteration sequence information which indicates what number iteration of event representing a loop iteration.

The attribute information about event, and for instance, it may be execution trace information, static information of program, or execution environment information of program.

The execution trace information is information representing an execution status which can be obtained during execution of program, and for instance, it may be information about processor core executing an event, command information executing an event, an execution term of an event, memory access information executed by an event, the number of function calls executed by an event, a variable value in an event, iteration information indicating an iteration count when an event is a loop iteration, or information indicating whether an event is an interruption processing or not.

The static information is static information obtained from a source code or a source code management system, and for example, it may be position information on a source code, program structure information, compilation information of a source code, version information of source code, information indicating whether a program is a kernel program or not, or information indicating whether a program is a user program or not.

The execution environment information is information about environment of execution of a program, and for instance, it may be a processor core name, a server name, or specification information about a server.

Second acquisition unit and Second storage unit (axis information acquisition unit and axis information storage unit)

The second acquisition unit 423 acquires axis information from the second storage unit 403 on demand from the first creation unit 407, the second creation unit 408 and the third creation unit 409, for instance. The second storage unit 403 is a storage for storing the axis information including timeline axis information, at least one piece of attribute axis information and at least one piece of information about identification of attribute for display (hereinafter referred to as display attribute identification information).

The axis information is information including at least timeline axis information and attribute axis information, and it can further include the display attribute identification information. The timeline axis information is information indicating a term (period of time) corresponding to each pitch in a screen of a display device. The attribute axis information is information including at least element name of axis and a coordinate indicating a display position of the element name. The display attribute identification information is information for specifying attribute to be displayed.

Example of Axis Information

FIG. 7 shows an example of axis information. As shown in FIG. 7, in an axis information 701, a timeline axis information 702 is constructed from display pitch information and term information indicated by each display pitch, and each attribute axis information 703 to 711 is constructed from element name information, a coordinate indicating a display position and display attribute identification information. In the example shown in FIG. 7, the timeline axis information 702 defines that the display pitch information is "1" and the term information indicated by the display pitch is "2". The attribute axis information 703 defines that the element name information is "core0", the coordinate indicating a display position is "0" and the display attribute identification information is "DISPLAY".

The timeline axis information is applicable as long as it is information indicating information represented by each pitch of a screen of a display device. For example, the timeline axis information may be term information per display pitch, display pitch information per term, information including at least a display pitch and term information indicated by the display pitch, the number of pieces of execution sequence information per display pitch, display pitch information per unit of execution sequence information, or information constructed from a display pitch and the number of pieces of execution sequence information indicated by the display pitch. The timeline axis information may be information preset in the system 401, information specified by a programmer, or information generated based on a screen size or a window size of a display device and execution term information to be displayed on a screen.

The attribute axis information includes an element name of an attribute axis and a coordinate indicating a display position about the element name. One element name of an attribute axis corresponds to one piece of attribute information in each event information in the event information 601. The element names of attribute axis may be information preset in the system 401 or information specified by a programmer.

The coordinate indicating the display position is information about a coordinate indicating a position on a screen of a display device for displaying an element name of the attribute axis. The coordinate indicating a display position may be information preset in the system 401, information specified by a programmer, or information generated based on a screen size or a window size of a display device and the number of elements of the attribute axis displayed on a single screen.

Second Creation Unit (Axis Object Creation Unit)

The second creation unit 408 inputs the axis information 701 acquired by the second acquisition unit 423 from the second storage unit 403, and creates a timeline axis object and an attribute axis object, which form a coordinate system for drawing a program execution status, based on the inputted axis information 701. In this description, although the coordinate system is a plane, the coordinate system can be a spatial coordinate system equal to or greater than three dimensions, or a coordinate system where two or more two-dimensional coordinate systems are overlapped with each other on the same plane. When using the axis information 701 shown in FIG. 7, the second creation unit 408 firstly creates the timeline axis object representing that one display pitch corresponds to a term "2" based on the timeline axis information 702. Then, the second creation unit 408 defines element names as labels from the attribute axis information, and creates the attribute axis object for arranging the labels based on the coordinate indicating a display position.

First Creation Unit (Event Object Creation Unit)

The first creation unit 407 inputs the event information 601 stored in the first storage unit 402 and the axis information 701 stored in the second storage unit 403 via the first acquisition unit 422 and the second acquisition unit 423, respectively. Furthermore, the first creation unit 407 decides a starting point coordinate and an ending point coordinate indicating a display position and a size in a direction of the timeline axis based on the execution term information and the timeline axis information in the event information 601, decides a coordinate indicating a display position in a direction of the attribute axis based on the attribute information in the event information 601 and the attribute axis information in the axis information 701, and creates an event object representing the event.

Here, the operation of the first creation unit 407 will be explained while focusing an event with the event unique ID "1" in an event information 603 shown in FIG. 6. Firstly, the first creation unit 407 calculates "2000÷2=1000" based on information "TERM PER DISPLAY PITCH IS 2" being the timeline axis information 702 in the axis information 701 and the execution start time "2000" in the event execution term information using a formula for a display start coordinate in a direction of a timeline axis "(EXECUTION START TIME)÷(TERM PER DISPLAY PITCH)", and calculates "(3000−2000)÷2=1000" using a formula for a display size in the direction of the timeline axis "(EXECUTION ENDING TIME−EXECUTION START TIME)÷(TERM PER DISPLAY PITCH)". Furthermore, the first creation unit 407 decides a display ending coordinate as "2000" based on an ending coordinate and the display size. Then, the first creation unit 407 defines the display coordinate in the direction of the attribute axis as "100" based on the attribute information "core1" in the event information 603 and attribute axis information 704 in the axis information 701 corresponding to "core1". Then, the first creation unit 407 creates an event object including information about the starting point coordinate and the ending point coordinate indicating the display position in the direction of the timeline axis, the size in the direction of the timeline axis and the coordinate indicating the display position in the direction of the attribute axis.

Third Acquisition Unit and Third Storage Unit (Area Definition Condition Candidate Information Acquisition Unit and Area Definition Condition Candidate Information Storage Unit)

The third acquisition unit 424 acquires at least one piece of condition candidate information from the third storage unit 424 on demand from the selection unit 411 and the fifth creation unit 414, for instance. The third storage unit 404 is a storage for storing at least one piece of condition candidate information. The condition candidate information is information including at least one piece of area definition condition information (hereinafter referred to as condition information).

The condition information is information including a piece of area starting point event identification information and a piece of area ending point event identification information. The area starting point event identification information is information for specifying an area starting point event specified from a plurality of pieces of the event information based on the attribute information. The area starting point event is an event with a minimum execution start time within a specific area in the direction of the timeline axis, for instance. The area ending point event identification information is information for specifying an area ending point event specified from the plurality of pieces of the event information based on the attribute information. The area ending event is an event with a maximum execution ending time within the specific area in the direction of the timeline axis.

The condition information may be a condition about the execution term information or a condition about the attribute information, for instance. The condition information may be information preset in the system 401, information inputted by a programmer, or information generated based on the event information 601.

Example of Condition Candidate Information

The above-described condition candidate information is managed using a condition candidate information list in which one or more pieces of individual condition information are listed. FIG. 8 shows an example of a condition candidate information list 801. In the example shown in FIG. 8, the condition candidate information list 801 includes fifteen pieces of condition information 802 to 816.

In FIG. 8, for instance, condition information 815 is a condition about event execution term, and it is a condition of specifying one or more events based on "EVENT WITH EXECUTION TERM LESS THAN 1000". Condition information 802 is a condition about the attribute information, and it is a condition for specifying one or more events in which "EVENT BELONGING TO LoopA" is "EVENT BELONGING TO LoopA" on the program structure.

The condition about execution term information is a condition capable of specifying at least one event from conditions such that execution start time, execution ending time or execution term of event is equal to, greater than or smaller than a specific value. The condition about attribute information is a condition capable of specifying at least one event from conditions with respect to information in the attribute information.

When the attribute information is a processor core name executing an event, for example, the condition about attribute information may be a condition indicating whether the attribute information is a specific processor core name or not, or the like. When the attribute information is command information executing an event, the condition may be a condition indicating whether the attribute information is a specific command or not, or the like. When the attribute information is memory access information, the condition may be a condition about address accessing indicating whether a specific address is accessed or not, a condition about an access number indicating whether the specific address is accessed for more than a specific number of times, or a combination of these conditions. When the attribute information is the number of function calls, the condition may be a condition about function call such that the number of function calls is equal to, greater than or smaller than a specific value, or the like. When the attribute information is a variable value, the condition may be a condition such that the variable value is equal to, greater than or smaller than a specific value, or the attribute information includes a specific character or a specific character string, or the like. When the attribute information indicates loop iteration and is iteration information indicating an iteration count, the condition may be a condition such that the iteration information is equal to, greater than or smaller than a specific value, or the like. When the attribute information is information indicating interrupt, the condition is a condition indicating whether an event is an interrupt processing or not. When the attribute information is position information on a source code, the condition may be a condition indicating whether the attribute information exists on a specific position on the source code or not, or a condition indicating whether the attribute information is described in a specific file or not, or the like. When the attribute information is program structure information, the condition may be a condition about structure information of an event being a specific function, an event belonging to a specific function, an event calling a specific function, an event belonging conditional branching, an event belonging a specific group, or the like. When the attribute information is compilation information of a source code, the condition may be a condition about compilation and compiler such that a version of compiler is equal to, greater than or smaller than a specific value, or whether a specific option is used in compilation, or the like. When the attribute information is version information of a source code, the condition may be a condition such that the version information is equal to, greater than or smaller than a specific value, or the like. When the attribute information is information indicating whether a program is a kernel program or not, the condition may be a condition indicating whether the program is a kernel program or not. When the attribute information is information indicating whether a program is a user program or not, the condition may be a condition indicating whether the program is a user program or not. When the attribute information is a processor core name, the condition may be a condition indicating whether the processor core name is equal to a specific value or not. When the attribute information is a server name, the condition may be a condition indicating whether the server name is equal to a specific value or not. When the attribute information is specification information about a server, the condition may be a condition about a specification of the server such that the number of cores of the server is equal to, greater than or smaller than a specific number, a memory capacity of the server is equal to, greater than or smaller than a specific value, a disk capacity of the server is equal to, greater than or smaller than a specific value, or a combination of at least one of these conditions.

Fifth Creation Unit (Hint Object Creation Unit)

Figure 9:
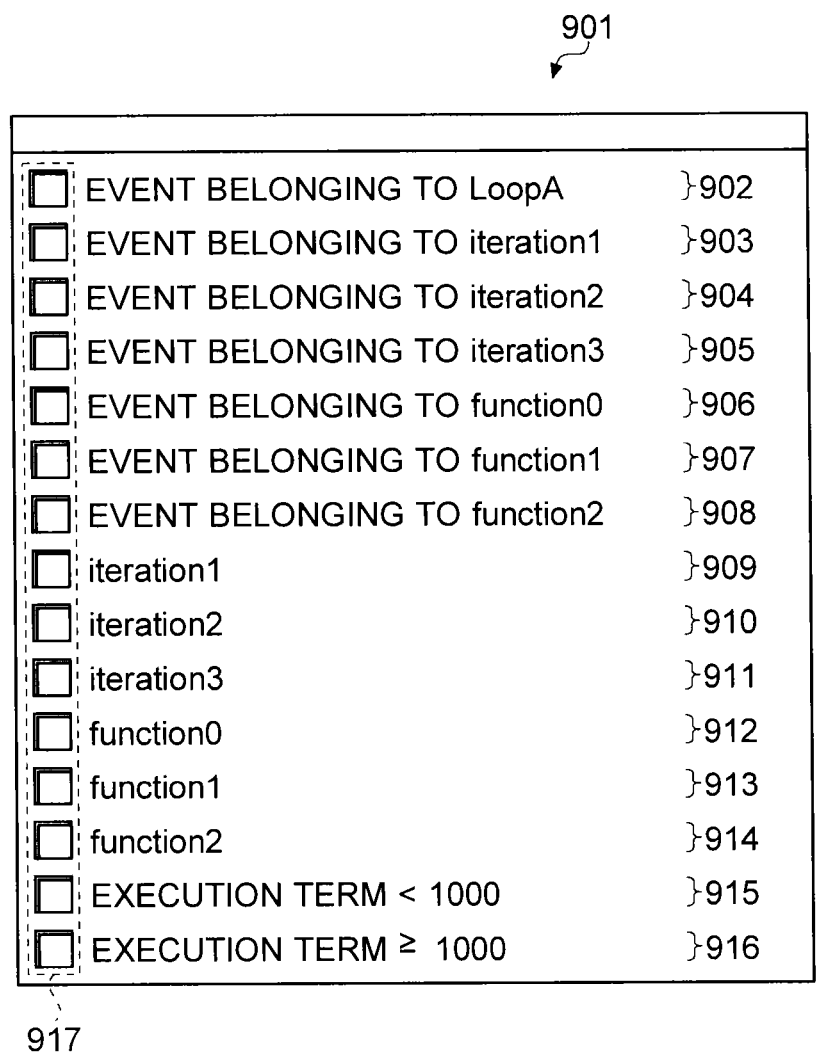
FIG. 9 is a diagram showing an display example of a hint object according to the first embodiment.

The fifth creation unit 414 inputs the condition candidate information acquired by the third acquisition unit 424 from the third storage unit 404, and creates a hint object representing condition information for specifying an event based on the inputted condition candidate information. FIG. 9 shows an example of a hint object according to the first embodiment. In FIG. 9, the example of a hint object 901 created by obtaining all condition information 802 to 816 from the condition candidate information list 801 shown in FIG. 8 is shown. As shown in FIG. 9, the hint object 901 includes items 902 to 916 representing the obtained condition information 802 to 816 as menu. To the items 902 to 916, checkboxes (also referred to as selection objects or selection user interface) 917 for making a user select one or more items are corresponded, respectively.

Selection Unit (Area Definition Condition Acquisition Unit)

The selection unit 411 inputs the condition candidate information acquired by the third acquisition unit 424 from the third storage unit 404, and selects at least one piece of condition information from the inputted condition candidate information. In the first embodiment, target condition information is selected among the inputted one or more condition information based on the hint object 901 displayed as a user interface (see FIG. 9), for instance. For example, when a user selects an item "EVENT BELONGING TO LoopA" from among the items 902 to 916 displayed on the hint object 901, the use selects a selection user interface 917 located beside "EVENT BELONGING TO LoopA". In the following, a case where checkboxes 917 corresponding to four items of "EVENT BELONGING TO LoopA", "EVENT BELONGING TO iteration1", "EVENT BELONGING TO iteration2" and "EVENT BELONGING TO iteration3" are selected by a user will be explained as an example.

Condition information corresponding to the items of which corresponding checkboxes 917 are checked by a user is inputted to the selection unit 411 as selection information (see step S506 in FIG. 5) with respect to the condition information. Therefore, in this case, condition information corresponding to the four items of "EVENT BELONGING TO LoopA" 902, "EVENT BELONGING TO iteration1" 903, "EVENT BELONGING TO iteration2" 904 and "EVENT BELONGING TO iteration3" 905 are inputted to the selection unit 411 as the selection information.

The checkboxes 917 are applicable as long as they have a structure for selecting condition information form condition candidate information, and it is not limited to the structure, which is exampled in the hint object 901 shown in FIG. 9, where the checkboxes 917 and the items 902 to 916 being condition information candidates are simultaneously displayed while each of the checkboxes 917 is made to correspond to each of the items 902 to 916. For instance, such a structure in that condition information is selected using a file, an appropriate structure for selecting condition information can be applied.

Update Unit (Area Definition Condition Information Update Unit)

The update unit 412 updates a condition information list 1001 stored in the fourth storage unit 405 based on at least one piece of condition information selected from among the condition candidate information by the selection unit 411. In the first embodiment, the condition information list 1001 stored in the fourth storage unit 405 is updated using condition information of "EVENT BELONGING TO LoopA", "EVENT BELONGING TO iteration1" and "EVENT BELONGING TO iteration3".

Fourth Acquisition Unit and Fourth Storage Unit (Area Definition Condition Information Acquisition Unit and Area Definition Condition Information Storage Unit)

The fourth acquisition unit 425 acquires at least one piece of condition information from the fourth storage unit 405 on demand from the fourth creation unit 413, for instance. The fourth storage unit 405 is a storage for storing at least one piece of condition information. FIG. 10 shows an example of a condition information list stored in the fourth storage unit 405. In the example, as a result of updating by the selection unit 411, as shown in FIG. 10, the condition information list 1001 is updated so that the list 1001 includes the condition information of "EVENT BELONGING TO LoopA" 1002, "EVENT BELONGING TO iteration1" 1003, "EVENT BELONGING TO iteration2" 1004 and "EVENT BELONGING TO iteration3" 1005.

Fourth Creation Unit (Area Information Creation Unit)

The fourth creation unit 413 inputs the event information list 601 acquired by the first acquisition unit 422 from the first storage unit 402, inputs the condition information 1001 acquired by the fourth acquisition unit 425 from the fourth storage unit 405, decides an area name, and selects one or more pieces of event information based on the condition information. Then, the fourth creation unit 413 decides an area from the selected event information, decides area term information based on the selected event information, and creates an area information. The area information is information defining an area in the direction of the timeline axis, and includes information for identifying at least an area and the area term information. For example, the information for identifying an area may be an area name or an ID inherent in an area.

Example of Area Information

FIG. 11 shows an example of the area information. As shown in FIG. 11, area information 1101 includes the area name and the area term information for every area item 1102 to 1105. The area term information is information constructed from area starting time information and area ending point time information. The area name is information which is to be a label of the area to be displayed on the system 401. The area term information is information for defining an area in the direction of the timeline axis. For example, the item 1102 is information in which the area name is set as "EVENT BELONGING TO LoopA", the area starting point time information is set as "2000", and the area ending point time information is set as "8000".

The area information is information for defining an area in the direction of the timeline axis. The area term information is applicable as long as it is information for defining an area in the direction of the timeline axis, and it is not limited to information including at least the area starting point time information and the area ending point time information while it also can be information including at least the area starting point time information and area term information indicating a period of time of the area.

Here, an example in that a range where two or more selected events are successive is defined as a single area will be explained. When six pieces of event information 603, 604, 605, 606, 607 and 608 each of which has "LoopA" as a structure are selected based on the program structure information in the event information, because the program structure information in the event information 603 is "function0:LoopA:iteration:function1:taskD", it is possible to determine that an event indicated by the event information 603 belongs to "LoopA". The fourth creation unit 413 decides an area. In the example, because a range where successive events continue is defined as a single area, a term in which the events indicated by the event information 603, 604, 605, 606, 607 and 608 are executed is defined as a single area.

Then, the fourth creation unit 413 decides an area starting point time based on the execution start time in the execution term information included in the selected event information. Because the execution start times in the selected event information are "2000", "3000", "4000", "5000", "6000" and "7000", "2000" being a minimum execution start time is defined as the area starting point time.

Then, the fourth creation unit 413 decides an area ending point time based on an execution ending time in the execution term information included in the selected event information. Because the execution ending times of the selected event information are "3000", "4000", "5000", "6000", "7000" and "8000", "8000" being a maximum execution ending time is defined as the area ending point time.

Then, the fourth creation unit 413 decides an area name "EVENT BELONGING TO LoopA" based on the condition information. After that, the fourth creation unit 413 creates area information 1102 in which the area name is "EVENT BELONGING TO LoopA", an area starting time is "2000" and an area ending time is "8000", and stores the area information 1102 in the fifth storage unit 406.

As the same with condition information 1003, 1004 and 1005, the fourth creation unit 413 creates area information 1103, 1104 and 1105, and stores the area information 1101 including these information in the fifth storage unit 406. Because the condition information 1003 selects "EVENT BELONGING TO iteration)", in the creation of the area information 1103 based on the condition information 1003, structure information on the program in the attribute information and iteration information in the attribute information included in the event information are used.

The area is a region including at least one event. Therefore, for example, a single event selected based on condition information, a range where two or more events selected based on condition information continue or a region including all of two or more events selected based on condition information can be defined as one area.

In a method of deciding the area starting point time, it is applicable that the area starting point time is decided based on an execution start time in execution term information included in event information of an event selected based on condition information, and it is also applicable that the area starting point time is decided based on an execution ending time in the execution term information included in the event information of the selected event.

In a method of deciding the area ending point time, it is applicable that the area ending point time is decided based on an execution ending time in execution term information included in event information of an event selected based on condition information, and it is also applicable that the area ending point time is decided based on an execution starting point time in the execution term information included in the event information of the selected event.

In creation of the area term information in a case where a single event selected based on condition information is defined as one area, the area starting point time can be defined as the execution start time, and the area ending point time can be defined as the execution ending time.

When an execution start time and an execution ending time of an event are the same, it is possible that the execution start time is regarded as the execution ending time and the execution ending time is regarded as the execution start time.

In creation of an area name, the area name can be decided based on condition information, selected event information, or information inputted from external.

Fifth Acquisition Unit and Fifth Storage Unit (Area Information Acquisition Unit and Area Information Storage Unit)

The fifth acquisition unit 426 acquires at least one piece of area information from the fifth storage unit 406 on demand from the third creation unit 409, for instance. The fifth storage unit 406 is a storage for storing at least one piece of area information.

Third Creation Unit (Area Object Creation Unit)

The third creation unit 409 inputs the axis information acquired by the second acquisition unit 423 from the second storage unit 403, inputs the area information acquired by the fifth acquisition unit 426 from the fifth storage unit 406, and decides a starting point coordinate and an ending point coordinate indicating a display position and a display range of an area object representing areas in the direction of the timeline axis based on the timeline axis information in the axis information and the area term information in the area information. The third creation unit 409 decides at least a starting point coordinate and an ending point coordinate of the area object to be displayed on a screen based on area term information in all the area information stored in the fifth storage unit 406. On this occasion, the third creation unit 409 determines whether an overlap area exists in the direction of the timeline axis, and when there is overlap area, the third creation unit 409 decides different coordinates indicating display positions in the direction of the attribute axis so that appropriate area objects do not overlap with each other in the direction of the attribute axis. Furthermore, in the first embodiment, because an area object is a rectangular object, the third creation unit 409 decides different display ranges in the direction of the attribute axis so that appropriate area objects do not overlap with each other in the direction of the attribute axis. After that, the third creation unit 409 creates area objects each of which includes a starting point coordinate and an ending point coordinate indicating a display position in the direction of the timeline axis, a display range in the direction of the timeline axis, a coordinate indicating a display position in the direction of the attribute axis, a display range in the direction of the attribute axis, and an area name of area information.

The creation of area object by the third creation unit 409 will be explained while focusing the area information 1102. Firstly, the third creation unit 409 calculates "2000÷2=1000" based on the information "TERM PER DISPLAY PITCH IS 2" being the timeline axis information 702 in the axis information 701 and the area starting point time "2000" of the area of the area information 1102 using the formula for the display starting point coordinate in the direction of the timeline axis "(EXECUTION START TIME)÷(TERM PER DISPLAY PITCH)", and calculates "(8000−2000)÷2=3000" using the formula for the display size in the direction of the timeline axis "(EXECUTION ENDING TIME−EXECUTION START TIME)÷(TERM PER DISPLAY PITCH)". Furthermore, the third creation unit 409 decides a display ending point coordinate as "4000" based on the starting point coordinate and the display size. Furthermore, the third creation unit 409 decides a coordinate indicating a display position in the direction of the attribute axis based on a screen size.

Then, the third creation unit 409 specifies the area information 1103, 1104 and 1105 which are overlapped with the area information 1102 based on the area term information in the area information stored in the fifth storage unit 406. Then, based on a display range of a first area object representing the area information 1102 including the area information 1103, 1104 and 1105 in the direction of the attribute axis, the third creation unit 409 decides the display range of the area information 1102 in the direction of the attribute axis so that the display range of the area information 1102 becomes greater than a display range of a second area object representing the area information 1103, 1104 and 1105 in the direction of the attribute axis.

Then, the third creation unit 409 defines an area name as "EVENT BELONGING TO LoopA" based on the area name in the area information 1102.

After that, the third creation unit 409 creates an area object including information about the starting point coordinate and the ending point coordinate indicating the display position and the display range in the direction of the timeline axis, the coordinate indicating the display position and the display range in the direction of the attribute axis, and the area name.

Here, the area object is applicable as long as it is an object representing an area in the direction of the timeline axis, and for instance, it may be a line object, a rectangular object, or another object representing an area.

Display Unit

The display unit 410 displays the axis objects, the event objects, the hint object and the area objects. In the following, an operation of the display unit 410 will be explained using an example of a program execution status display region 1201 after selection of the condition information shown in FIG. 12. In this explanation, a case where a displayable region is displayed on a screen and a display region can be shifted using a scroll bar will be examples.

Display Axis Object

The display unit 410 inputs the axis objects from the second creation unit 408, and displays the axis objects based on the display information added to the axis objects. Among the axis objects, the timeline axis object displays labels of time information by a constant interval, and the attribute axis object displays attribute labels. In the example shown in FIG. 12, a timeline axis displays from "0" to "9000", for instance. The labels are arranged by 1000. It is applicable that the display unit 410 may display axis objects with displayable sizes depending on an inputted display size such as a screen size or a window size, and it is also applicable that the display unit 410 may expand or minify sizes of the axis objects to displayable sizes depending on the inputted display size.

Display Event Object

Figures 12, 13:
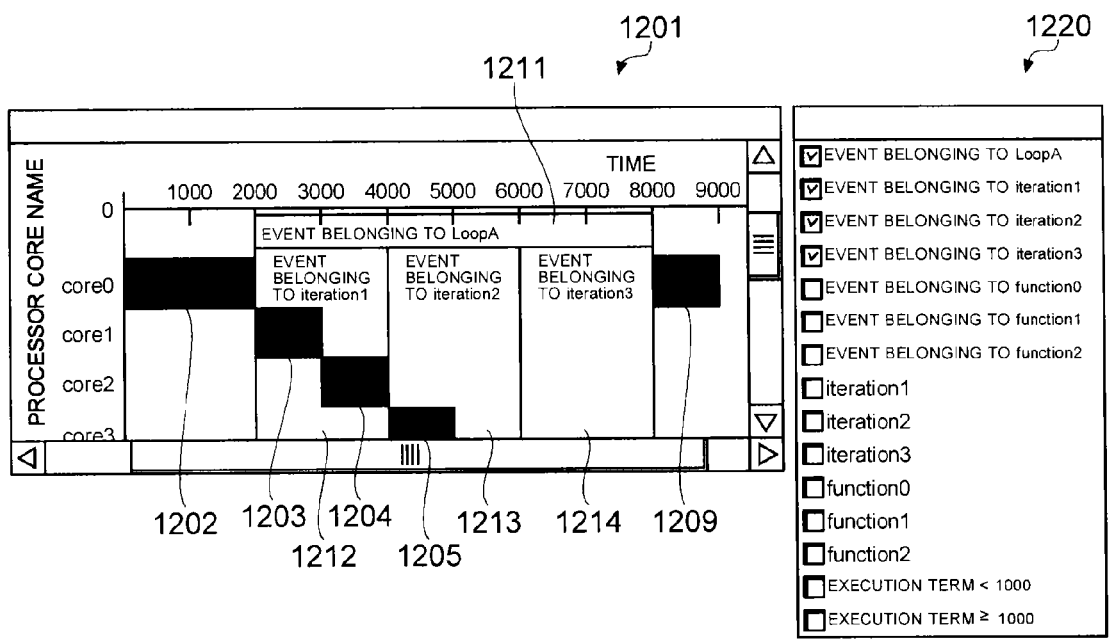
FIG. 12 is a diagram showing an display example of a program execution status after selecting condition according to the first embodiment.
FIG. 13 is a diagram showing an example of a program using in a second embodiment.

The display unit 410 inputs the event objects from the first creation unit 407, and draws the event objects on a screen based on the starting point coordinate and the ending point coordinate in the direction of the timeline axis and the coordinate in the direction of the attribute axis, which indicate the display position, added to the event objects. As shown in FIG. 12, in this example, event objects representing the events 602, 603, 604, 605 and 609 are displayed as event objects 1202, 1203, 1204, 1205 and 1209 in this order. It is applicable that the display unit 410 may display event objects with displayable sizes depending on the inputted display size such as a screen size or a window size, and it is also applicable that the display unit 410 may expand or minify sizes of the event objects to displayable sizes depending on the inputted display size.

Display Hint Object

The display unit 410 inputs the hint object from the fifth creation unit 414, and draws a hint object 1220 on the screen based on the coordinate indicating the display position added to the hint object. As shown in FIG. 12, the hint object 1220 may be displayed as a window different from the program execution status display region 1201 displaying the event objects. The hint object 1220 can be normally displayed or be displayed on demand from a user. In the example shown in FIG. 12, a case where "EVENT BELONGING TO LoopA", "EVENT BELONGING TO iteration)", "EVENT BELONGING TO iteration2" and "EVENT BELONGING TO iteration3" are selected is shown.

Display Area Object

The display unit 410 inputs the area objects from the third creation unit 409, and draws the area objects on the screen based on the starting point coordinate and the ending point coordinate in the direction of the timeline axis and the coordinate in the direction of the attribute axis, which indicate the display position, added to the area objects. Furthermore, the display unit 410 displays area names based on the area names added to the area objects. The program execution status display region 1201 shown in FIG. 12 is a display example after selection of the area definition condition. Because the area definition conditions of "EVENT BELONGING TO LoopA", "EVENT BELONGING TO iteration1", "EVENT BELONGING TO iteration2" and "EVENT BELONGING TO iteration3" are selected in the hint object 1220, on the program execution status display region 1201, an area object 1211 indicating "EVENT BELONGING TO LoopA", an area object 1212 indicating "EVENT BELONGING TO iteration1", an area object 1213 indicating "EVENT BELONGING TO iteration2" and an area object 1214 indicating "EVENT BELONGING TO iteration3" are displayed.

Any display object can be used for an area object as long as an object representing a range including a starting point and an ending point of an area. When at least a part of area objects is overlapped, the area objects can be displayed as long as each area object can be identified each other.

As described above, according to the first embodiment, it is possible to effectively display a program executing status including massive events to a user. Furthermore, by displaying a hint object together with the program execution status, it is possible to display the program execution status interactively and effectively.

Second Embodiment

Next, a data processing system, a method and a program product of creating program information, and a program information display system according to a second embodiment will be described in detail with accompanying drawings. In the second embodiment, a case where an area is decided based on information about timeline sequence in event information will be explained as an example.

In the second embodiment, a case where an execution status when a program 1301 exampled in FIG. 13 is executed is displayed will be explained as an example. As shown in FIG. 13, the program 1301 includes three types of events which are "LoopA" 1302, "LoopB" 1303 and "taskA" 1304.

Axes used in displaying a program execution status according to the second embodiment are a timeline axis and an attribute axis. However, in the second embodiment, the timeline axis is an axis representing an execution sequence of the event "taskA" and the attribute axis is an axis which defines execution terms of events as elements.

Figure 14:
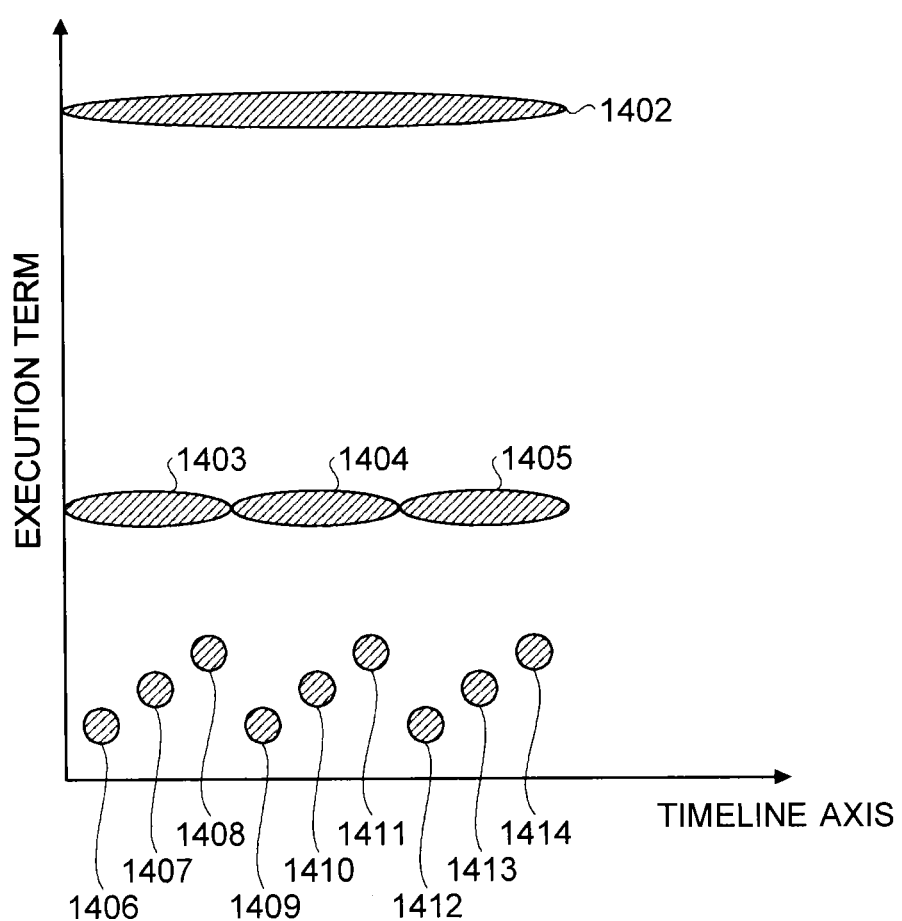
FIG. 14 is a diagram showing an example of an execution status of the program shown in FIG. 13.

In the second embodiment, as shown in FIG. 14, by displaying an event "LoopA" 1402 and events "LoopB" 1403, 1404 and 1405 so that they have range information in the direction of the timeline axis while displaying events "taskA" 1406 to 1414, it is possible to display a plurality of events at one time.

An event is a unit of processing occurring during execution of a program or a process, and it may be a structural unit of program such as function, loop, conditional branching, and so forth, or may be a specific process such as memory access, command execution, thread creation, synchronous processing, and so forth.

Figure 15:
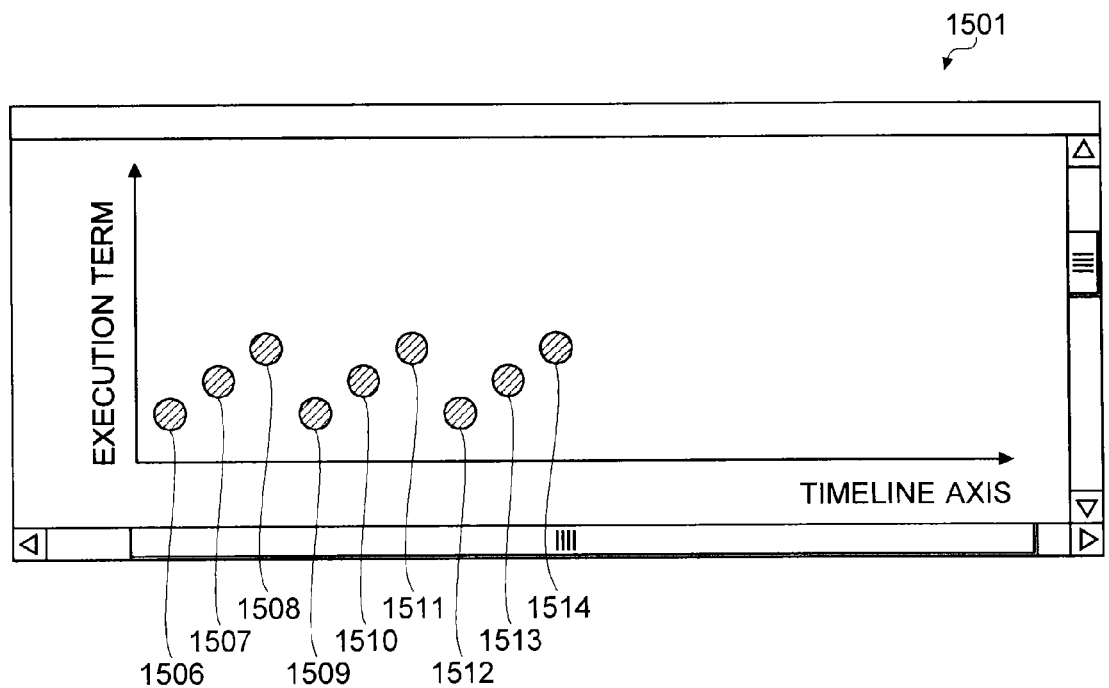
FIG. 15 is a diagram showing a display example of the execution status of the program shown in FIG. 13.
Figure 16:
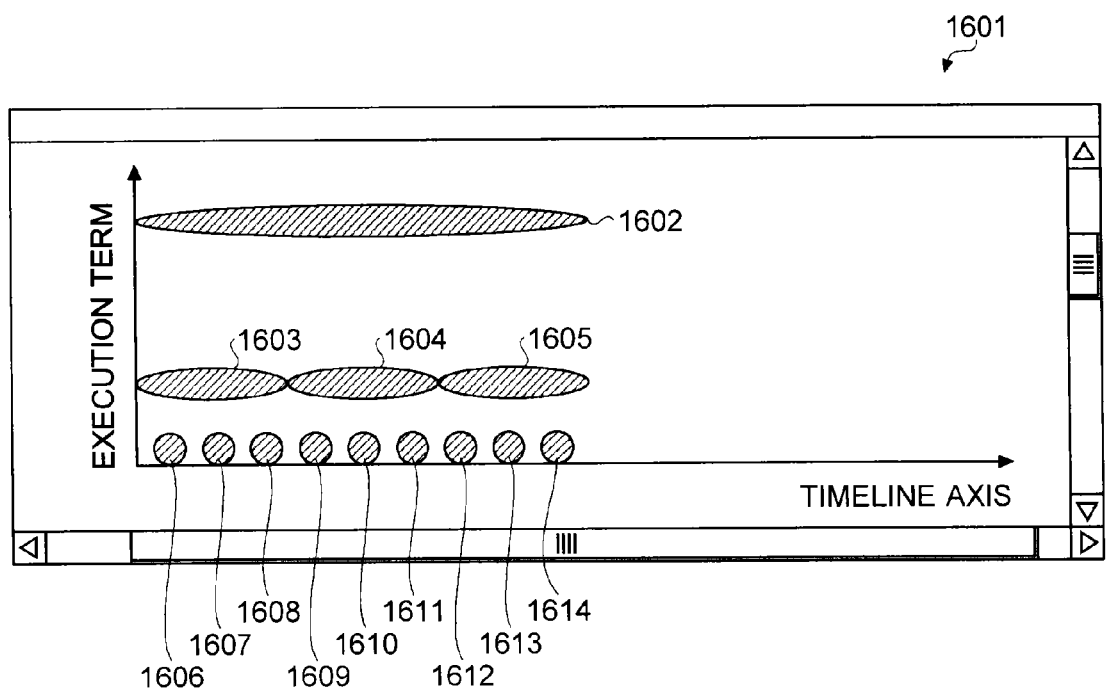
FIG. 16 is a diagram showing another display example of the execution status of the program shown in FIG. 13.

However, because a screen size or a window size being a display device has limited region, there is a limit to the number of elements that can be displayed on the attribute axis at one time. In FIGS. 15 and 16, a display example of a case where a program execution status exampled in FIG. 14 does not fit within a screen size or a window size being a display device is shown.

FIG. 15 is an illustration showing an example of a program execution status display region 1501 in a case where a display size of an attribute axis element is fixed. In the example shown in FIG. 15, it is impossible to display the whole in a direction of an execution timeline axis of an attribute axis, and therefore, it is impossible to display the events "LoopA" and "LoopB" at one time. In such case, although it is possible to shift the display region using a scroll bar, or the like, according to shift of the display range using the scroll bar, or the like, a problem such that a user can not view undisplayed element parts in the attribute axis at one time will be remained.

FIG. 16 is an illustration showing an example of a program execution status display region 1601 in a case where all elements in the attribute axis are displayed at one time. In the example shown in FIG. 16, elements are displayed while the display size in the attribute axis is decided based on the screen size or the window size. Therefore, characters and events may be displayed in collapsed forms depending on the drawing performance, and therefore, the events may not be displayed visibly. For example, although among execution terms of events "taskA" 1406, 1407 and 1408 in FIG. 14, it is possible to discriminate that the execution term of "taskA" 1407 is greater than the execution term "taskA" 1406 and the execution term of "taskA" 1408 is greater than the execution term "taskA" 1407, in the example shown in FIG. 16, the execution terms of events "taskA" 1606, 1607 and 1608 corresponding to "taskA" 1606, 1607 and 1608 are discriminated as the same, and therefore, it is difficult to discriminate rightly.

In the second embodiment, by additionally displaying one or more event relating with each other, a user is made able to easily understand an execution status of massive events.

A program execution status display system according to the second embodiment can have the same configuration as the system 401 exampled in the first embodiment. Operation of the program execution status display system according to the second embodiment can be the same operation (see FIG. 5) exampled in the first embodiment. Therefore, as the configuration and the operation of the program execution status display system according to the second embodiment, by referencing the explanations using FIGS. 4 and 5, the redundant explanations thereof will be omitted. Structures of units in the program execution status display system according to the second embodiment will be the followings.

First Acquisition Unit and First Storage Unit (Event Information Acquisition Unit and Event Information Storage Unit)

The first acquisition unit 422 acquires at least one piece of event information from the first storage unit 402 on demand from the first creation unit 407 and the fourth creation unit 413, for instance. The first storage unit 402 is a storage for storing at least one piece of event information. The event information is information about event executed during execution of program, and includes at least event specific information, event timeline information and attribute information.

Example of Event Information

The event information will be explained using a case of executing the program 1301 shown in FIG. 13. The program 1301 is structured in that "LoopB" 1303 is executed thrice during a term of "LoopA" 1302 and "taskA" is executed thrice during a term of "LoopB" 1303.

"LoopA" 1302 is executed from a time "0" till a time "1800". During this execution term, "LoopB" 1303 is executed thrice. Execution terms of iterations is constructed from a term from the time "0" till a time "600", a term from the time "600" till a time "1200" and a term from the time "1200" till the time "1800". Then, in a first iteration of "LoopB", "taskA" 1304 is executed thrice, and this execution term is constructed from a term from the time "0" till a time "100", a term from the time "100" till a time "300 and a term from the time "300" till the time "600". In a second iteration of "LoopB", "taskA" 1304 is executed thrice, and this execution term is constructed from a term from the time "600" till a time "700", a term from the time "700" till a time "900 and a term from the time "900" till the time "1200". In a third iteration of "LoopB", "taskA" 1304 is executed thrice, and this execution term is constructed from a term from the time "1200" till a time "1300", a term from the time "1300" till a time "1500 and a term from the time "1500" till the time "1800".

FIG. 17 shows an example of event information list managing event information according to the second embodiment. As shown in FIG. 6, the event information list 1701 includes an unique ID which is event specific information assigned in execution sequence, timeline information including information about event execution sequence and an execution term, which is the same program structure with the event timeline information, and a processor core name executing event, program structure information and iteration information indicating an iteration count of the attribute information.

In the example shown in FIG. 17, the event information list 1701 stores thirteen pieces of event information, and a single line indicates one piece of event information. For example, the event information 1705 has, in order of the unique ID in event specific information, the event execution sequence information in the event timeline information, the starting point execution sequence information on the timeline axis, the ending point execution sequence information on the timeline axis, the execution term information in the event timeline information, the program structure information about in the attribute information, the iteration information about "LoopA" in the attribute information and the iteration information about "LoopB" in the attribute information, information "3", "2", "2", "2", "200", "function0:LoopA:iteration:LoopB:iteration:taskA", "1" and "2". The event information 1705 indicates an event in that the unique ID is "2", an event having the same program structure is a second execution sequence, and the execution term is "200". Furthermore, the event information 1705 indicates that a correspond event is "taskA" in an iteration in "LoopB" in iteration in "LoopA" in "function0" on the program structure and the event is "taskA" event executed in a second iteration of "LoopB" executed a first iteration of "LoopA".

The event information 1703 has, in order of the unique ID in event specific information, the event execution sequence information in the event timeline information, the starting point execution sequence information on the timeline axis, the ending point execution sequence information on the timeline axis, the execution term information in the attribute information, the program structure information about in the attribute information, the iteration information about "LoopA" in the attribute information and the iteration information about "LoopB" in the attribute information, information "1", "1", "1", "3", "600", "function0:LoopA:iteration:LoopB", "1" and "0". The event information 1703 indicates an event in that the unique ID is "1", an event having the same program structure is a first execution sequence, and the execution term is "600". Furthermore, the event information 1703 indicates that a corresponding event is "taskB" event in a first iteration in "LoopA" in "fuction0" on the program structure. Because the starting point execution sequence information in the timeline axis is "1" and the ending point execution sequence information in the timeline axis is "3", the event information 1703 indicates that the event correspond to first, second and third executions in the execution sequence information about "taskA".

The event specific information is information for specifying a certain event from a plurality of pieces of event information included in the first storage unit 402, and for example, it may be an event unique name or an even unique ID.

The event timeline information is information indicating temporal variations, and for example, it may be an execution term information or an execution sequence information.

The execution term information is information, and for example, it may be information including at least an execution start time and an execution term, at least an execution start time and an execution ending time or at least an execution term and an execution ending time, or be an execution start time or an execution ending time of event.

The execution start time, the execution ending time and the execution term are term information, and for instance, it may be a processor time in program execution, or term information generated based on the processor time.

The event execution sequence information is information indicating a sequence of executing events, and for instance, it may be information about execution sequence of events with the same program structure information, sequence information with respect to execution of the whole program, or sequence information on the program structure with iterated execution such as in-iteration sequence information which indicates what number iteration of event representing a loop iteration.

The attribute information about event, and for instance, it may be execution trace information, static information of program, or execution environment information of program.

The execution trace information is information representing an execution status which can be obtained during execution of program, and for instance, it may be information about processor core executing an event, command information executing an event, an execution term of an event, memory access information executed by an event, the number of function calls executed by an event, a variable value in an event, iteration information indicating a iteration count when an event is a loop iteration, or information indicating whether an event is an interruption processing or not.

The static information of program is static information obtained from a source code or a source code management system, and for example, it may be position information on a source code, program structure information, compilation information of a source code, version information of a source code, information indicating whether a program is a kernel program or not, or information indicating whether a program is a user program or not.

The execution environment information of program is information about environment of execution of a program, and for instance, it may be a processor core name, a server name, or specification information about a server.

Second Acquisition Unit and Second Storage Unit (Axis Information Acquisition Unit and Axis Information Storage Unit)

The second acquisition unit 423 acquires axis information from the second storage unit 403 on demand from the first creation unit 407, the second creation unit 408 and the third creation unit 409, for instance. The second storage unit 403 is a storage for storing the axis information including timeline axis information, at least one piece of attribute axis information and at least one piece of display attribute identification information.

The axis information is information including at least the timeline axis information and the attribute axis information, and it can further include the display attribute identification information. The timeline axis information is information indicating an execution sequence of events of "taskA" corresponding to each pitch in a screen of a display device. The attribute axis information is information including at least an element name of axis and a coordinate indicating a display position of the element name. The display attribute identification information is information for specifying attribute to be displayed.

Example of Axis Information

FIG. 18 shows an example of axis information. As shown in FIG. 18, in an axis information 1801, a timeline axis information 1802 is constructed from display pitch information and term information indicated by each display pitch, and each attribute axis information 1803 to 1808 arc constructed from element name information, a coordinate indicating a display position and display attribute identification information. In the example shown in FIG. 18, the timeline axis information 1802 defines that the display pitch information is "1" and the execution sequence information indicated by the display pitch is "1". The attribute axis information 1803 defines that the element name information is "0", the coordinate indicating the display position is "0" and the display attribute identification information is "DISPLAY".

The timeline axis information is applicable as long as it is information indicating information represented by each pitch of a screen of a display device. For example, the timeline axis information may be term information per display pitch, display pitch information per term, information including at least a display pitch and term information indicated by the display pitch, execution sequence information per display pitch, display pitch information per unit of execution sequence information, or information including at least a display pitch and the execution sequence information indicated by the display pitch. The timeline axis information may be information preset in the system, information specified by a programmer, or information generated based on a screen size or a window size of a display device and execution term information to be displayed on a screen.

The attribute axis information includes an element name of an attribute axis and a coordinate indicating a display position about the element name. As the element names of attribute axes, there is information corresponding to attribute information in each event information in the event information 1701. One of the attribute names of attribute axes corresponds to attribute information in event information corresponding to an attribute axis. The element names of attribute axes may be information preset in the system or information specified by a programmer.

The coordinate indicating the display position is information indicating a position on a screen of a display device for displaying an element name of the attribute axis. The coordinate indicating a display position may be information preset in the system, information specified by a programmer, or information generated based on a screen size or a window size of a display device and the number of elements of the attribute axis displayed on a single screen.

Second Creation Unit (Axis Object Creation Unit)

The second creation unit 408 inputs the axis information 1801 acquired by the second acquisition unit 423 from the second storage unit 403, and creates a timeline axis object and an attribute axis object, which form a coordinate system for drawing a program execution status, based on the inputted axis information 1801. In this description, although the coordinate system is a plane, the coordinate system can be a spatial coordinate system equal to or greater than three dimensions, or a coordinate system where two or more two-dimensional coordinate systems are overlapped with each other on the same plane. The second creation unit 408 firstly creates the timeline axis object representing one unit of execution sequence information per one display pitch based on the timeline axis information 1802. Then, the second creation unit 408 defines element names as labels from the attribute axis information, and creates the attribute axis object for arranging the labels based on the coordinate indicating the display position.

First Creation Unit (Event Object Creation Unit)

The first creation unit 407 inputs the event information 1701 stored in the first storage unit 402 and the axis information 1801 stored in the second storage unit 403 via the first acquisition unit 422 and the second acquisition unit 423, respectively. Furthermore, the first creation unit 407 decides a starting point coordinate and an ending point coordinate indicating a display position and a size in the direction of the timeline axis based on the event execution sequence information and the timeline axis information in the event information 1701, decides a coordinate indicating a display position in the direction of the attribute axis based on the attribute information in the event information 1701 and the attribute axis information in the axis information 1801, and creates an event object representing the event.

Here, the operation of the first creation unit 407 will be explained while focusing an event with the event unique ID "1" in an event information 1703 shown in FIG. 17. Firstly, the first creation unit 407 decides a coordinate indication a display position by calculating "1÷1=1" based on information "NUMBER OF EXECUTION SEQUENCE INFORMATION PER DISPLAY PITCH IS 1" being the timeline axis information 1802 in the axis information 1801 and the starting point execution sequence information "1" on the timeline axis of the event 1703 using a formula "(EXECUTION SEQUENCE INFORMATION)÷(NUMBER OF EXECUTION SEQUENCE INFORMATION PER DISPLAY PITCH)". Then, the first creation unit 407 decides a display size by calculating "3÷1=3" based on information "NUMBER OF EXECUTION SEQUENCE INFORMATION PER DISPLAY PITCH IS 1" being the timeline axis information 1802, the starting point execution sequence information "1" and the ending point execution sequence information "3" on the timeline axis in the event 1703 using a formula "(NUMBER OF EXECUTION SEQUENCE INFORMATION)÷(NUMBER OF EXECUTION SEQUENCE INFORMATION PER DISPLAY PITCH)". Then, the first creation unit 407 defines the coordinate of the display position in the direction of the attribute axis as "600" based on the execution term information "600" in the attribute information in the event information 1703 and attribute axis information 1804 in the axis information 1801 corresponding to "600". Then, the first creation unit 407 creates an event object including information about the coordinate indicating the display position in the direction of the timeline axis and the coordinate indicating the display position in the direction of the attribute axis.

Third Acquisition Unit and Third Storage Unit (Area Definition Condition Candidate Information Acquisition Unit and Area Definition Condition Candidate Information Storage Unit)

The third acquisition unit 424 acquires at least one piece of condition candidate information from the third storage unit 424 on demand from the selection unit 411 and the fifth creation unit 414, for instance. The third storage unit 404 is a storage for storing at least one piece of condition candidate information. The condition candidate information is information including at least one piece of condition information.

The condition information is information including a piece of area starting point event identification information and a piece of area ending point event identification information. The area starting point event identification information is information for specifying an area starting point event specified from a plurality of pieces of the event information based on the attribute information. The area starting point event is an event with a minimum execution start time within a specific area in the direction of the timeline axis, for instance. The area ending point event identification information is information for specifying an area ending point event specified from the plurality of pieces of the event information based on the attribute information. The area ending event is an event with a maximum execution ending time within the specific area in the direction of the timeline axis.

The condition information may be a condition about the execution term information or a condition about the attribute information, for instance. The condition information may be information preset in the system, information inputted by a programmer, or information generated based on the event information 1701.

Example of Condition Candidate Information

The above-described condition candidate information is managed using a condition candidate information list in which one or more pieces of individual condition information are listed. FIG. 19 shows an example of a condition candidate information list 1901. In the example shown in FIG. 19, the condition candidate information list 801 includes ten pieces of condition information 1902 to 1910.

In FIG. 19, for instance, condition information 1910 is a condition about event execution term, and it is a condition of specifying one or more events based on "EVENT WITH EXECUTION TERM LESS THAN 1000". Condition information 1902 is a condition about the attribute information, and it is a condition for specifying one or more events in which "EVENT BELONGING TO LoopA" is "EVENT BELONGING TO LoopA" on the program structure.

The condition about the timeline information of event may be a condition capable of specifying at least one event from conditions such that execution term of event is equal to, greater than or smaller than a specific value, or a condition capable of specifying at least one event from conditions such that execution sequence information of event is equal to, greater than or smaller than a specific value.

The condition about execution term information is a condition capable of specifying at least one event from conditions such that execution start time, execution ending time or execution term of event is equal to, greater than or smaller than a specific value. The condition about attribute information is a condition capable of specifying at least one event from conditions with respect to information in the attribute information.

When the attribute information is a processor core name executing an event, for example, the condition about attribute information may be a condition indicating whether the attribute information is a specific processor core name or not, or the like. When the attribute information is command information executing an event, the condition may be a condition indicating whether the attribute information is a specific command or not, or the like. When the attribute information is memory access information, the condition may be a condition about address accessing indicating whether a specific address is accessed or not, a condition about an access number indicating whether the specific address is accessed for more than a specific number of times, or a combination of these conditions. When the attribute information is the number of function calls, the condition may be a condition about function call such that the number of function calls is equal to, greater than or smaller than a specific value, or the like. When the attribute information is a variable value, the condition may be a condition such that the variable value is equal to, greater than or smaller than a specific value, or the attribute information includes a specific character or a specific character string, or the like. When the attribute information indicates loop iteration and is iteration information indicating an iteration count, the condition may be a condition such that the iteration information is equal to, greater than or smaller than a specific value, or the like. When the attribute information is information indicating interrupt, the condition is a condition indicating whether an event is an interrupt processing or not. When the attribute information is position information on a source code, the condition may be a condition indicating whether the attribute information exists on a specific position on the source code or not, or a condition indicating whether the attribute information is described in a specific file or not, or the like. When the attribute information is program structure information, the condition may be a condition about structure information of an event being a specific function, an event belonging to a specific function, an event calling a specific function, an event belonging conditional branching, an event belonging a specific group, or the like. When the attribute information is compilation information of a source code, the condition may be a condition about compilation and compiler such that a version of compiler is equal to, greater than or smaller than a specific value, or whether a specific option is used in compilation, or the like. When the attribute information is version information of a source code, the condition may be a condition such that the version information is equal to, greater than or smaller than a specific value, or the like. When the attribute information is information indicating whether a program is a kernel program or not, the condition may be a condition indicating whether the program is a kernel program or not. When the attribute information is information indicating whether a program is a user program or not, the condition may be a condition indicating whether the program is a user program or not. When the attribute information is a processor core name, the condition may be a condition indicating whether the processor core name is equal to a specific value or not. When the attribute information is a server name, the condition may be a condition indicating whether the server name is equal to a specific value or not. When the attribute information is specification information about a server, the condition may be a condition about a specification of the server such that the number of cores of the server is equal to, greater than or smaller than a specific number, a memory capacity of the server is equal to, greater than or smaller than a specific value, a disk capacity of the server is equal to, greater than or smaller than a specific value, or a combination of at least one of these conditions.

Fifth Creation Unit (Hint Object Creation Unit)

The fifth creation unit 414 inputs the condition candidate information acquired by the third acquisition unit 424 from the third storage unit 404, and creates a hint object representing condition information for specifying an event based on the inputted condition candidate information. FIG. 20 shows an example of a hint object according to the first embodiment. In FIG. 20, the example of a hint object 2001 created by obtaining all condition information 1902 to 1911 from the condition candidate information list 1901 shown in FIG. 19 is shown. As shown in FIG. 20, the hint object 2001 includes items 2012 being "EVENTS OF EXECUTION SEQUENCE FROM 1 TO 5 OF taskA" in addition to items 2002 to 2011 representing the obtained condition information 1902 to 1911 as menu. To the items 2002 to 2011, checkboxes (also referred to as selection objects or selection user interface) 2017 for making a user select one or more items are corresponded, respectively.

Selection Unit (Area Definition Condition Acquisition Unit)

The selection unit 411 inputs the condition candidate information acquired by the third acquisition unit 424 from the third storage unit 404, and selects at least one piece of condition information from the inputted condition candidate information. In the first embodiment, target condition information is selected among the inputted one or more condition information based on the hint object 2001 displayed as a user interface (see FIG. 20). When a user selects items "EVENT BELONGING TO LoopA" 2002 and "iteration EVENT OF LoopA" 2003 from among the items 2002 to 2011 displayed on the hint object 2001, the use selects selection user interfaces 917 corresponded to these items.

Condition information corresponding to the items of which corresponding checkboxes 2017 are checked by a user is inputted to the selection unit 411 as selection information (see step S506 in FIG. 5) with respect to the condition information. Therefore, in this case, condition information corresponding to the items of "EVENT BELONGING TO LoopA" 2002 and "Iteration event OF LoopA" 2003 are inputted to the selection unit 411 as the selection information.

The checkboxes 2017 are applicable as long as they have a structure for selecting condition information form condition candidate information, and it is not limited to the structure, which is exampled in the hint object 2001 shown in FIG. 20, where the checkboxes 2017 and the items 2002 to 2011 being condition information candidates are simultaneously displayed while each of the checkboxes 2017 is made to correspond to each of the items 2002 to 2011. For instance, such a structure in that condition information is selected using a file, an appropriate structure for selecting condition information can be applied.

Update Unit (Area Definition Condition Information Update Unit)

The update unit 412 updates a condition information list 2101 stored in the fourth storage unit 405 based on at least one piece of condition information selected from among the condition candidate information by the selection unit 411. In the second embodiment, the condition information list 2101 stored in the fourth storage unit 405 is updated using condition information of "EVENT BELONGING TO LoopA" 1902 and "iteration EVENT OF LoopA".

Fourth Acquisition Unit and Fourth Storage Unit (Area Definition Condition Information Acquisition Unit and Area Definition Condition Information Storage Unit)

The fourth acquisition unit 425 acquires at least one piece of condition information from the fourth storage unit 405 on demand from the fourth creation unit 413, for instance. The fourth storage unit 405 is a storage for storing at least one piece of condition information. FIG. 21 shows an example of a condition information list 2101 stored in the fourth storage unit 405. As shown in FIG. 21, an updated condition information list 2101 includes the condition information of "EVENT BELONGING TO LoopA" 2102 and "iteration EVENT OF LoopA" 2103.

Fourth Creation Unit (Area Information Creation Unit)

The fourth creation unit 413 inputs the event information list 1701 acquired by the first acquisition unit 422 from the first storage unit 402, inputs the condition information 2101 acquired by the fourth acquisition unit 425 from the fourth storage unit 405, decides an area name, and selects one or more pieces of event information based on the condition information. Then, the fourth creation unit 413 decides an area from the selected event information, decides area execution sequence information based on the selected event information, and creates an area information. The area information is information defining an area in the direction of the timeline axis, and includes information for identifying at least an area and the area term information. For example, the information for identifying an area may be an area name or an ID inherent in an area.

Example of Area Information

FIG. 22 shows an example of the area information. As shown in FIG. 22, area information 2201 includes an area name and area timeline information for every area item 2202 to 2205. The area timeline information is information including at least area starting point execution sequence information and area ending point execution sequence information. The area name is information which is to be a label of the area to be displayed on the system. The area term information is information for defining an area in the direction of the timeline axis.

For example, the item 2202 is information in which the area name is "EVENT BELONGING TO LoopA", the area starting point execution sequence information is "1", and the area ending point execution sequence information is "9".

When single condition information defines a plurality of areas, area information is created for each area. For example, when the condition information 2101 shown in FIG. 21 includes condition information including a plurality of pieces of condition information 1904 to 1906 such as "iteration EVENT OF LoopA", area information 2203 to 2205 are created for the plurality of the pieces of condition information.

The area information is information for defining an area in the direction of the timeline axis, and it includes at least an area name and area timeline information. The area timeline information is applicable as long as it is information for defining an area in the direction of the timeline axis, and it is not limited to information including at least the area starting point execution sequence information and the area ending point execution sequence information while it also can be information including at least the area starting point execution sequence information and area term information indicating a width of the area in the direction of the timeline axis.

Here, an example in that a range where two or more selected events are successive is defined as a single area will be explained. When twelve pieces of event information 1703, 1704, 1705, 1706, 1707, 1707, 1708, 1709, 1710, 1711, 1712, 1713 and 1714 each of which has "LoopA" as a structure are selected based on the program structure information in the event information, because the program structure information in the event information 1703 is "function0:LoopA:iteration:LoopB:iteration:taskA", it is possible to determine that an event indicated by the event information 1703 belongs to "LoopA". The fourth creation unit 413 decides an area. In the example, because a range where successive events continue is defined as a single area, a term in which the events 1703, 1704, 1705, 1706, 1707, 1707, 1708, 1709, 1710, 1711, 1712, 1713 and 1714 are executed is defined as a single area.

Then, the fourth creation unit 413 decides an area starting point execution sequence information based on a magnitude relation of the execution sequence information in the selected event information. Because the execution sequence information in the selected event information are "1", "2", "3", "4", "5", "6", "7", "8" and "9", "1" being a minimum execution sequence is defined as the area starting point execution sequence information.

Then, the fourth creation unit 413 decides an area ending point execution sequence based on the magnitude relation of the execution sequence information in the selected event information. Because the execution sequence information in the selected event information are "1", "2", "3", "4", "5", "6", "7", "8" and "9", "9" being a maximum execution sequence is defined as the area ending point execution sequence information.

Then, the fourth creation unit 413 decides an area name "EVENT BELONGING TO LoopA" based on the condition information. After that, the fourth creation unit 413 creates area information 2202 in which the area name is "EVENT BELONGING TO LoopA", an area starting point execution sequence is "1" and an area ending point execution sequence is "9", and stores the area information 2202 in the fifth storage unit 406.

Furthermore, the fourth creation unit 413 creates area information 2203, 2204 and 2205 based on the condition information 2103, and stores the area information 2201 including these information in the fifth storage unit 406.

Events satisfying the condition of "iteration EVENT OF LoopA" in the area definition condition 2103 are "ITERATION1 EVENT OF LoopA", "iteration2 EVENT OF LoopA" and "iteration3 EVENT OF LoopA". For example, because "EVENT BELONGING TO iteration1 OF LoopA" is corresponding to the event information 1703, 1704 and 1705, areas of these event information 1703, 1704 and 1705 are defined as a single area.

Then, the fourth creation unit 413 decides an area starting point execution sequence based on a magnitude relation of the execution sequence information in the selected event information. Because the execution sequence information in the selected event information are "1", "2" and "3", "1" being a maximum execution sequence is defined as the area starting point execution sequence information.

Then, the fourth creation unit 413 decides an area ending point execution sequence based on a magnitude relation of the execution sequence information in the selected event information. Because the execution sequence information in the selected event information are "1", "2" and "3", "3" being a maximum execution sequence is defined as the area ending point execution sequence information.

Then, the fourth creation unit 413 decides an area name "iteration1 OF LoopA" based on the condition information. After that, the fourth creation unit 413 creates area information 2203 in which the area name is "iteration1 OF LoopA", an area starting point execution sequence is "1" and an area ending point execution sequence is "3", and stores the area information 2203 in the fifth storage unit 406. Likewise, the fourth creation unit 413 creates area information 2204 and 2205 based on "EVENT BELONGING TO iteration2 OF LoopA" and "EVENT BELONGING TO iteration3 OF LoopA", and store the area information 2204 and 2205 in the fifth storage unit 406.

The area is a region including at least one event. Therefore, for example, a single event selected based on condition information, a range where two or more events selected based on condition information continue or a region including all of two or more events selected based on condition information can be defined as one area.

In a method of deciding the area starting point execution sequence information, the area starting point execution sequence information can be decided based on an event execution sequence information included in event information of an event selected based on condition information.

In a method of deciding the area ending point execution sequence information, the area ending point execution sequence information can be decided based on an event execution sequence information included in event information of an event selected based on condition information.

In creation of the area timeline information in a case where a single event selected based on condition information is defined as one area, the area starting point execution sequence information can be defined as the execution sequence information, and the area ending point execution sequence information can be defined as the execution sequence information.

In creation of an area name, the area name can be decided based on condition information, selected event information, or information inputted from external.

Fifth Acquisition Unit and Fifth Storage Unit (Area Information Acquisition Unit and Area Information Storage Unit)

The fifth acquisition unit 426 acquires at least one piece of area information from the fifth storage unit 406 on demand from the third creation unit 409, for instance. The fifth storage unit 406 is a storage for storing at least one piece of area information.

Third Creation Unit (Area Object Creation Unit)

The third creation unit 409 inputs the axis information acquired by the second acquisition unit 423 from the second storage unit 403, inputs the area information acquired by the fifth acquisition unit 426 from the fifth storage unit 406, and decides a starting point coordinate and an ending point coordinate indicating a display position and a display range of an area object representing areas in the direction of the timeline axis based on the timeline axis information in the axis information and the area timeline information in the area information. The third creation unit 409 decides at least a starting point coordinate and an ending point coordinate of the area object to be displayed on a screen based on area timeline information in all the area information stored in the fifth storage unit 406. On this occasion, the third creation unit 409 determines whether an overlap area exists in the direction of the timeline axis, and when there is overlap area, the third creation unit 409 decides different coordinates indicating display positions in the direction of the attribute axis so that appropriate area objects do not overlap with each other in the direction of the attribute axis. Furthermore, in the second embodiment, because an area object is a rectangular object, the third creation unit 409 decides different display ranges in the direction of the attribute axis so that appropriate area objects do not overlap with each other in the direction of the attribute axis. After that, the third creation unit 409 creates area objects each of which includes a starting point coordinate and an ending point coordinate indicating a display position in the direction of the timeline axis, a display range in the direction of the timeline axis, a coordinate indicating a display position in the direction of the attribute axis, a display range in the direction of the attribute axis, and an area name of area information.

The creation of area object by the third creation unit 409 will be explained while focusing the area information 2202. Firstly, the third creation unit 409 calculates "1÷1=1" based on the information "NUMBER OF EXECUTION SEQUENCE INFORMATION PER DISPLAY PITCH IS 1" being the timeline axis information 1802 in the axis information 1801 and the area starting point execution sequence information "1" of the area of the area information 2202 using the formula for the display starting point coordinate in the direction of the timeline axis "(AREA STARTING POINT EXECUTION SEQUENCE INFORMATION)÷(NUMBER OF EXECUTION SEQUENCE INFORMATION PER DISPLAY PITCH)", and calculates "9÷1=9" using the formula for the display size in the direction of the timeline axis "(NUMBER OF EXECUTION SEQUENCE INFORMATION INCLUDED IN AREA STARTING POINT EXECUTION SEQUENCE INFORMATION AND AREA ENDING POINT EXECUTION INFORMATION)÷(NUMBER OF EXECUTION SEQUENCE INFORMATION PER DISPLAY PITCH)". Furthermore, the third creation unit 409 decides an ending point coordinate as "10" based on the starting point coordinate and the display size. Furthermore, the third creation unit 409 decides a coordinate indicating a display position in the direction of the attribute axis based on a screen size.

Then, the third creation unit 409 specifies the area information 2203, 2204 and 2205 which are overlapped with the area information 2202 based on the area term information in the area information stored in the fifth storage unit 406. Then, based on a display range of a first area object representing the area information 2202 including the area information 2203, 2204 and 2205 in the direction of the attribute axis, the third creation unit 409 decides the display range of the area information 2202 in the direction of the attribute axis so that the display range of the area information 2202 becomes greater than a display range of a second area object representing the area information 2203, 2204 and 2205 in the direction of the attribute axis.

Then, the third creation unit 409 defines an area name as "EVENT BELONGING TO LoopA" based on the area name in the area information 2202. After that, the third creation unit 409 creates an area object including information about the starting point coordinate and the ending point coordinate indicating the display position and the display range in the direction of the timeline axis, the coordinate indicating the display position and the display range in the direction of the attribute axis, and the area name.

Here, the area object is applicable as long as it is an object representing an area in the direction of the timeline axis, and for instance, it may be a line object, a rectangular object, or another object representing an area.

Display Unit

The display unit 410 displays the axis objects, the event objects, the hint object and the area objects. In the following, an operation of the display unit 410 will be explained using an example of a program execution status display region 2301 after selection of the condition information shown in FIG. 23. In this explanation, a case where a displayable region is displayed on a screen and a display region can be shifted using a scroll bar will be exampled.

Display Axis Object

The display unit 410 inputs the axis objects from the second creation unit 408, and displays the axis objects based on the display information added to the axis objects. Among the axis objects, the timeline axis object displays labels of execution sequence information by a constant interval, and the attribute axis object displays attribute labels. In the example shown in FIG. 23, a timeline axis displays from "1" to "9", for instance. It is applicable that the display unit 410 may display axis objects with displayable sizes depending on an inputted display size such as a screen size or a window size, and it is also applicable that the display unit 410 may expand or minify sizes of the axis objects to displayable sizes depending on the inputted display size.

Display Event Object

Figure 23:
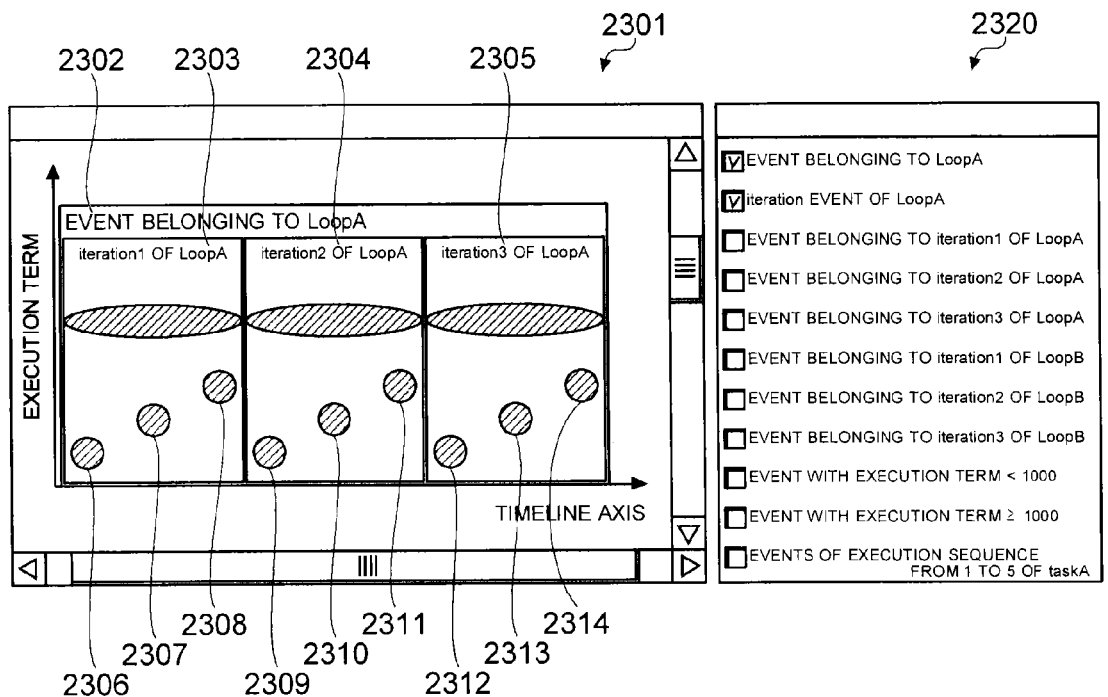
FIG. 23 is a diagram showing an display example of a program execution status after selecting condition according to the second embodiment.

The display unit 410 inputs the event objects from the first creation unit 407, and draws the event objects on a screen based on the starting point coordinate and the ending point coordinate in the direction of the timeline axis and the coordinate in the direction of the attribute axis, which indicate the display position, added to the event objects. As shown in FIG. 23, in this example, event objects representing the events 1704, 1705, 1706, 1708, 1709, 1710, 1712, 1713 and 1714 are displayed as event objects 2306 to 2314 in this order. It is applicable that the display unit 410 may display event objects with displayable sizes depending on the inputted display size such as a screen size or a window size, and it is also applicable that the display unit 410 may expand or minify sizes of the event objects to displayable sizes depending on the inputted display size.

Display Hint Object

The display unit 410 inputs the hint object from the fifth creation unit 414, and draws a hint object 2320 on the screen based on the coordinate indicating the display position added to the hint object. As shown in FIG. 23, the hint object 2320 may be displayed as a window different from the program execution status display region 2301 displaying the event objects. The hint object 2320 can be normally displayed or be displayed on demand from a user. In the example shown in FIG. 23, a case where "EVENT BELONGING TO LoopA" and "iteration EVENT OF LoopA" are selected is shown.

Display Area Object

The display unit 410 inputs the area objects from the third creation unit 409, and draws the area objects on the screen based on the starting point coordinate and the ending point coordinate in the direction of the timeline axis and the coordinate in the direction of the attribute axis, which indicate the display position, added to the area objects. Furthermore, the display unit 410 displays area names based on the area names added to the area objects. The program execution status display region 2301 shown in FIG. 23 is a display example after selection of the area definition condition. Because the area definition conditions of "EVENT BELONGING TO LoopA" and "iteration EVENT OF LoopA" are selected in the hint object 2320, on the program execution status display region 2301, an area object 2302 indicating "EVENT BELONGING TO LoopA", and an area object 2303 indicating "EVENT BELONGING TO iteration1 OF LoopA", an area object 2304 indicating "EVENT BELONGING TO iteration2 OF LoopA" and an area object 2305 indicating "EVENT BELONGING TO iteration3 OF LoopA", which are specified by "iteration EVENT OF LoopA", are displayed.

Any display object can be used for an area object as long as an object representing a range including a starting point and an ending point of an area. When at least a part of area objects is overlapped, the area objects can be displayed as long as each area object can be identified each other.

As described above, according to the second embodiment, it is possible to effectively display a program executing status including massive events to a user. Furthermore, by displaying a hint object together with the program execution status, it is possible to display the program execution status interactively and effectively. The other configurations, operations and effects may be the same as the other embodiment.

Third Embodiment

Next, a data processing system, a method and a program product of creating program information, and a program information display system according to a third embodiment will be described in detail with accompanying drawings. In the third embodiment, a case where an area has a display range (bar chart version) in the direction of the attribute axis will be explained as an example.

Figure 24:
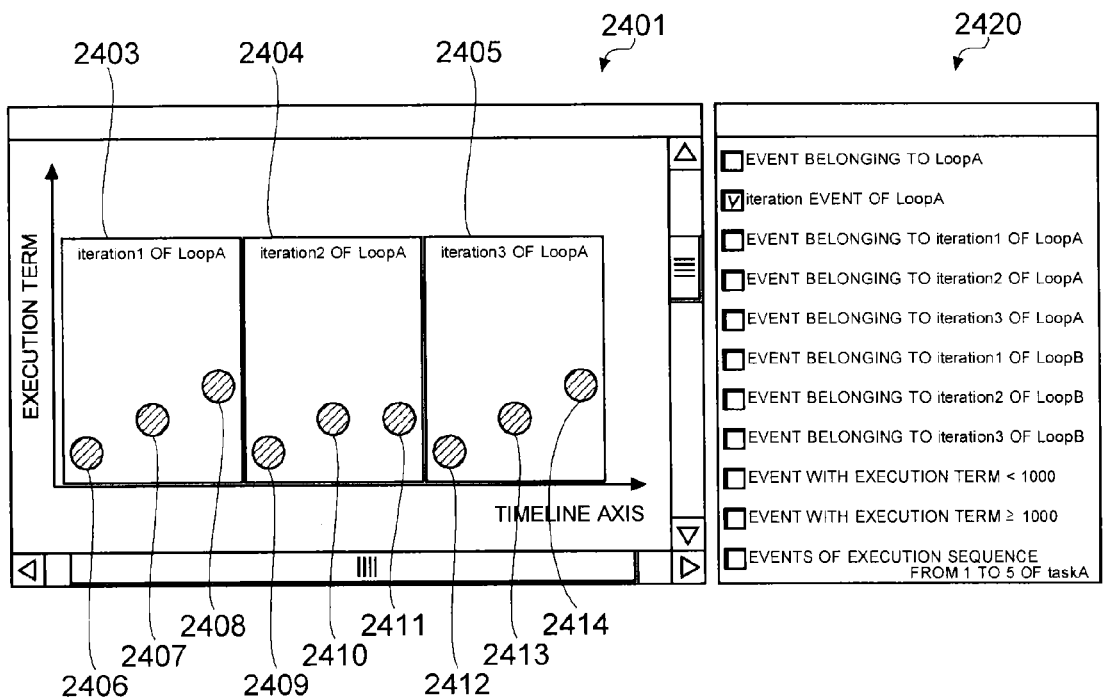
FIG. 24 is a diagram showing a display example of the execution status of the program shown in FIG. 13.

In the second embodiment, as the second embodiment, a case where an execution status when a program 1301 examined in FIG. 13 is executed is displayed will be explained as an example. In the third embodiment, as shown in FIG. 24, by displaying an event "LoopA" 2403 and events "LoopB" 2404, 2405 and 2406 so that they have range information in the direction of the timeline axis while displaying event "taskA" 2402, it is possible to display a plurality of events at one time.

Figure 25:
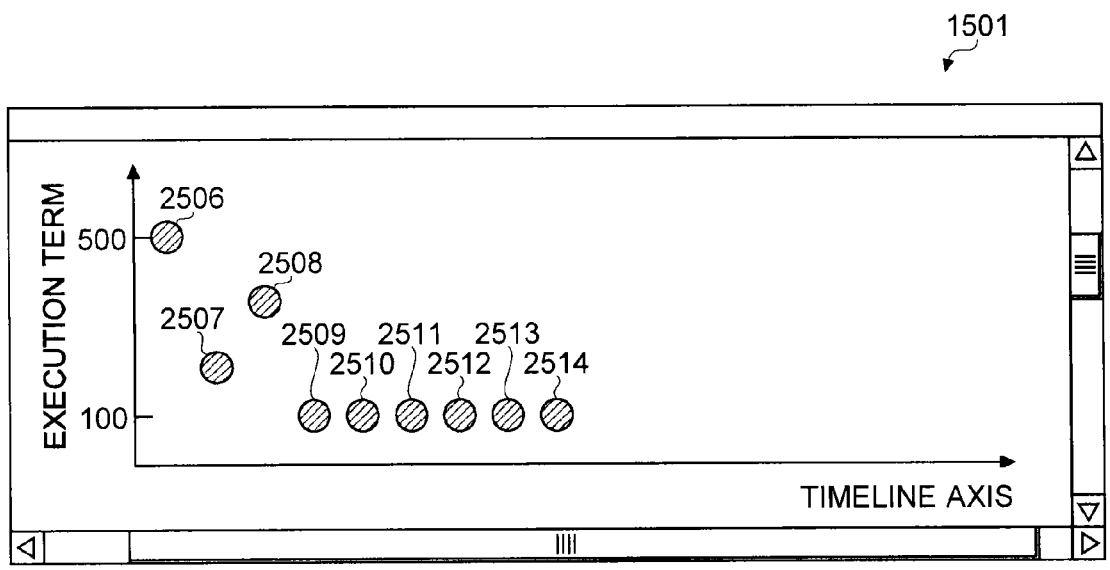
FIG. 25 is a diagram showing another display example of the execution status of the program shown in FIG. 13.
Figure 26:
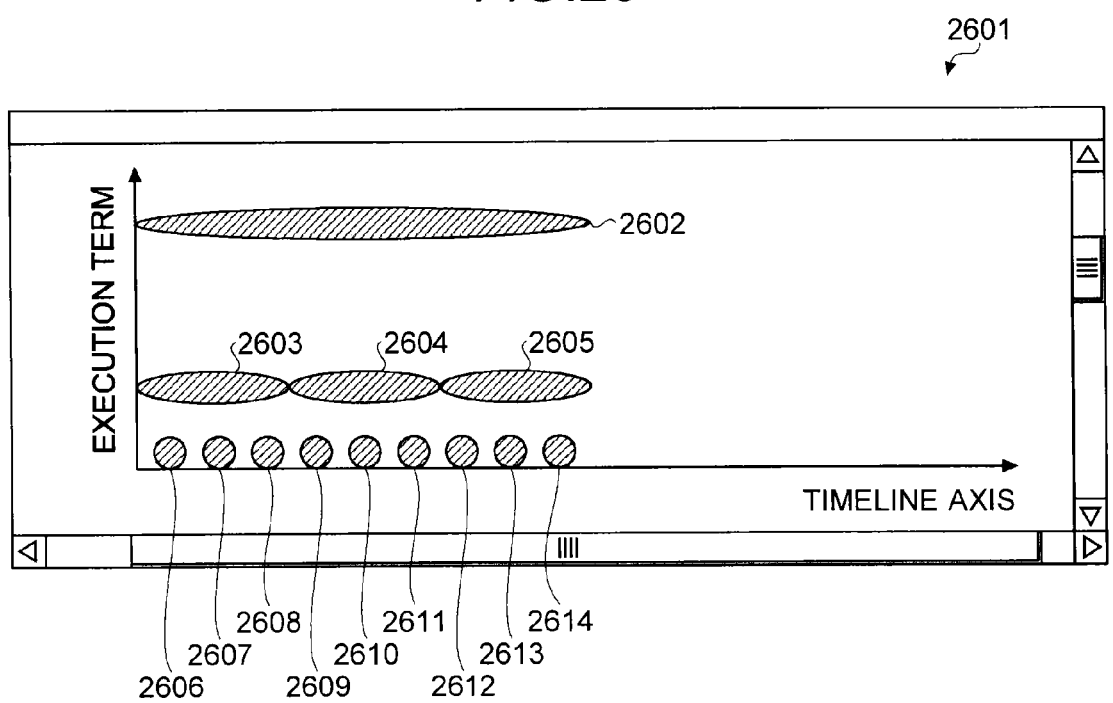
FIG. 26 is a diagram showing yet another display example of the execution status of the program shown in FIG. 13.

However, because a screen size or a window size being a display device has limited region, there is a limit to the number of elements that can be displayed on the attribute axis at one time. In FIGS. 25 and 26, a display example of a case where a program execution status exampled in FIG. 24 does not fit within a screen size or a window size being a display device is shown.

FIG. 25 is an illustration showing an example of a program execution status display region in a case where a display size of an attribute axis element is fixed. In the example shown in FIG. 25, it is impossible to display the whole in a direction of an execution timeline axis of an attribute axis, and therefore, it is impossible to display the events "LoopA" and "LoopB" at one time. In such case, although it is possible to shift the display region using a scroll bar, or the like, according to shift of the display range using the scroll bar, or the like, a problem such that a user can not view undisplayed element parts in the attribute axis at one time will be remained.

FIG. 26 is an illustration showing an example of a program execution status display region in a case where all elements in the attribute axis are displayed at one time. In the example shown in FIG. 26, elements are displayed while the display size in the attribute axis is decided based on the screen size or the window size. Therefore, characters and events may be displayed in collapsed forms depending on the drawing performance, and therefore, the events may not be displayed visibly. For example, although among execution terms of events "taskA" 2406, 2407 and 2408 in FIG. 24, it is possible to discriminate that the execution term of "taskA" 2407 is greater than the execution term "taskA" 2406 and the execution term of "taskA" 2408 is greater than the execution term "taskA" 2407, in the example shown in FIG. 26, the execution terms of events "taskA" 2606, 2607 and 2608 corresponding to "taskA" 2606, 2607 and 2608 are discriminated as the same, and therefore, it is difficult to discriminate rightly.

In the third embodiment, by additionally displaying one or more event relating with each other, a user is made able to easily understand an execution status of massive events.

A program execution status display system according to the third embodiment can have the same configuration as the system 401 exampled in the first embodiment. Operation of the program execution status display system according to the third embodiment can be the same operation (see FIG. 5) exampled in the first embodiment. Therefore, as the configuration and the operation of the program execution status display system according to the third embodiment, by referencing the explanations using FIGS. 4 and 5, the redundant explanations thereof will be omitted. Structures of units in the program execution status display system according to the third embodiment will be the followings.

First Acquisition Unit and First Storage Unit (Event Information Acquisition Unit and Event Information Storage Unit)

As the second embodiment, the first acquisition unit 422 acquires at least one piece of event information from the first storage unit 402 on demand from the first creation unit 407 and the fourth creation unit 413, for instance. Furthermore, as the second embodiment, the first storage unit 402 is a storage for storing at least one piece of event information. The event information is information about event executed during execution of program, and includes at least event specific information, event timeline information and attribute information.

Example of Event Information

Here, event information exampled in the third embodiment is explained. In the third embodiment, as the second embodiment, the event information will be explained using a case of executing the program 1301 shown in FIG. 13.

"LoopA" 1302 is executed from the time "0" till the time "1800". During this execution term, "LoopB" 1303 is executed thrice. Execution terms of iterations is constructed from a term from the time "0" till a time "600", a term from the time "600" till a time "1200" and a term from the time "1200" till the time "1800". Then, in a first iteration of "LoopB", "taskA" 1304 is executed thrice, and this execution term is constructed from a term from the time "0" till a time "500", a term from the time "500" till a time "700 and a term from the time "700" till the time "1000". In a second iteration of "LoopB", "taskA" 1304 is executed thrice, and this execution term is constructed from a term from the time "1000" till a time "1100", a term from the time "1100" till a time "1200 and a term from the time "1200" till the time "1300". In a third iteration of "LoopB", "taskA" 1304 is executed thrice, and this execution term is constructed from a term from the time "1300" till a time "1400", a term from the time "1400" till a time "1500 and a term from the time "1500" till the time "1800".

FIG. 17 shows an example of event information list managing event information according to the third embodiment. As shown in FIG. 6, the event information list 2701 includes an unique ID which is event specific information assigned in execution sequence, timeline information including information about event execution sequence and an execution term, which is the same program structure with the event timeline information, and a processor core name executing event, program structure information and iteration information indicating an iteration count of the attribute information.

In the example shown in FIG. 27, the event information list 2701 stores thirteen pieces of event information, and a single line indicates one piece of event information. For example, the event information 2705 has, in order of the unique ID in event specific information, the event execution sequence information in the event timeline information, the starting point execution sequence information on the timeline axis, the ending point execution sequence information on the timeline axis, the execution term information in the event timeline information, the program structure information about in the attribute information, the iteration information about "LoopA" in the attribute information and the iteration information about "LoopB" in the attribute information, information "3", "2", "2", "2", "200", "function0:LoopA:iteration: LoopB:iteration:taskA", "1" and "2". The event information 2705 indicates an event in that the unique ID is "2", an event having the same program structure is a second execution sequence, and the execution term is "200". Furthermore, the event information 2705 indicates that a correspond event is "taskA" in an iteration in "LoopB" in iteration in "LoopA" in "function0" on the program structure and the event is "taskA" event executed in a second iteration of "LoopB" executed a first iteration of "LoopA".

Event information 2703 has, in order of the unique ID in event specific information, the event execution sequence information in the event timeline information, the starting point execution sequence information on the timeline axis, the ending point execution sequence information on the timeline axis, the execution term information in the attribute information, the program structure information about in the attribute information, the iteration information about "LoopA" in the attribute information and the iteration information about "LoopB" in the attribute information, information "1", "1", "1", "3", "1000", "function0:LoopA:iteration: LoopB", "1" and "0". The event information 2703 indicates an event in that the unique ID is "1", an event having the same program structure is a first execution sequence, and the execution term is "1000". Furthermore, the event information 2703 indicates that a corresponding event is "taskB" event in a first iteration in "LoopA" in "fuction0" on the program structure. Because the starting point execution sequence information in the timeline axis is "1" and the ending point execution sequence information in the timeline axis is "3", the event information 2703 indicates that the event correspond to first, second and third executions in the execution sequence information about "taskA".

The event specific information, the event timeline information, the execution term information, the execution start time, the execution ending time, the execution term, the event execution sequence information, the attribute information, the execution trace information, the static information of program and the execution environment information of program can be the same as those in the second embodiment.

Second Acquisition Unit and Second Storage Unit (Axis Information Acquisition Unit and Axis Information Storage Unit)

The second acquisition unit 423 acquires axis information from the second storage unit 403 on demand from the first creation unit 407, the second creation unit 408 and the third creation unit 409, for instance. The second storage unit 403 is a storage for storing the axis information including timeline axis information, at least one piece of event object attribute axis information, at least one piece of area object attribute axis information and at least one piece of display attribute identification information.

The axis information is information including at least the timeline axis information, the event object attribute axis information and the area object attribute axis information, and it can further include the display attribute identification information. The timeline axis information is information indicating an execution sequence of events of "taskA" corresponding to each pitch in a screen of a display device. Each of the event object attribute axis information and the area object attribute axis information is information including an element name of axis and a coordinate indicating a display position of the element name. The display attribute identification information is information for specifying attribute to be displayed.

Example of Axis Information

FIG. 28 shows an example of axis information. As shown in FIG. 28, in an axis information 2801, a timeline axis information 2802 is constructed from display pitch information and term information indicated by each display pitch, event object attribute axis information 2803 to 2808 are constructed from element name information, a coordinate indicating a display position and display attribute identification information, and the area object attribute axis information 2809 to 2811 are constructed from element name information, a coordinate indicating a display position and display attribute identification information. In the example shown in FIG. 28, the timeline axis information 2802 defines that the display pitch information is "1" and the execution sequence information indicated by the display pitch is "1". The event object attribute axis information 2803 defines that the element name information is "0", the coordinate indicating the display position is "0" and the display attribute identification information is "DISPLAY". The area object attribute axis information 2809 defines that the element name information is "0", the coordinate indicating the display position is "0" and the display attribute identification information is "DISPLAY".

The event object attribute axis information includes an element name of an attribute axis and a coordinate indicating a display position of the element name. As the element names of attribute axes, there is information corresponding to attribute information in each event information in the event information 2701. One of the attribute names of attribute axes corresponds to attribute information in event information corresponding to an attribute axis. The element names of attribute axes may be information preset in the system or information specified by a programmer.

The area object attribute axis information includes an element name of an attribute axis and a coordinate indication a display position of the element name. As the element names of attribute axes, there is information corresponding to attribute information in each event information in the event information 2701. One of the attribute names of attribute axes corresponds to attribute information in event information corresponding to an attribute axis. The element names of attribute axes may be information preset in the system or information specified by a programmer.

In addition, the timeline axis information and the coordinate indicating the display position can be the same as those in the second embodiment. Furthermore, the event object attribute axis information can be the same as the area object attribute axis information.

Second Creation Unit (Axis Object Creation Unit)

The second creation unit 408 inputs the axis information 2801 acquired by the second acquisition unit 423 from the second storage unit 403, and creates a timeline axis object and an attribute axis object, which form a coordinate system for drawing a program execution status, based on the inputted axis information 2801. In this description, although the coordinate system is a plane, the coordinate system can be a spatial coordinate system equal to or greater than three dimensions, or a coordinate system where two or more two-dimensional coordinate systems are overlapped with each other on the same plane. The second creation unit 408 firstly creates the timeline axis object representing one unit of execution sequence information per one display pitch based on the timeline axis information 2802. Then, the second creation unit 408 defines element names as labels from the event object attribute axis information and the area object attribute axis information, and creates the attribute axis object for arranging the labels based on the coordinate indicating the display position. Here, it is not necessary that the attribute axis object is common to an event object and an area object. For example, it is applicable that an attribute axis object is created for an event object based on the event object attribute axis element information and another attribute axis object is created for an area object based on the area object attribute axis element information.

First Creation Unit (Event Object Creation Unit)

As the same with the second embodiment, the first creation unit 407 inputs the event information 1701 stored in the first storage unit 402 and the axis information 2801 stored in the second storage unit 403 via the first acquisition unit 422 and the second acquisition unit 423, respectively. Furthermore, the first creation unit 407 decides a starting point coordinate and an ending point coordinate indicating a display positions and a size in the direction of the timeline axis based on the event execution sequence information and the timeline axis information in the event information 2701, decides a coordinate indicating a display position in the direction of the attribute axis based on the attribute information in the event information 2701 and the event object attribute axis information and the area object attribute axis information in the axis information 2801, and creates an event object and an area object representing the event and the area.

Here, the operation of the first creation unit 407 will be explained while focusing an event with the event unique ID "1" in an event information 2703 shown in FIG. 27. Firstly, the first creation unit 407 decides a starting point coordinate indicating a display position by calculating "1÷1=1" based on information "NUMBER OF EXECUTION SEQUENCE INFORMATION PER DISPLAY PITCH IS 1" being the timeline axis information 2802 in the axis information 2801 and the starting point execution sequence information "1" on the timeline axis of the event 2703 using a formula "(EXECUTION SEQUENCE INFORMATION)÷(NUMBER OF EXECUTION SEQUENCE INFORMATION PER DISPLAY PITCH)". Then, the first creation unit 407 decides a display size by calculating "3÷1=3" based on information "NUMBER OF EXECUTION SEQUENCE INFORMATION PER DISPLAY PITCH IS 1" being the timeline axis information 2802, the starting point execution sequence information "1" and the ending point execution sequence information "3" on the timeline axis in the event 2703 using a formula "(NUMBER OF EXECUTION SEQUENCE INFORMATION)÷(NUMBER OF EXECUTION SEQUENCE INFORMATION PER DISPLAY PITCH)". Furthermore, the first creation unit 407 decides an ending point coordinate as "4" based on the starting point coordinate and the display size. Then, the first creation unit 407 defines the coordinate indicating the display position in the direction of the attribute axis as "1000" based on the execution term information "1000" in the attribute information in the event information 2703 and attribute axis information 2804 in the axis information 1801 corresponding to "1000". Then, the first creation unit 407 creates an event object including information about the starting point coordinate and the ending point coordinate indicating the display position in the direction of the timeline axis and the coordinate indicating the display position in the direction of the attribute axis. This is the same for the area object.

Third Acquisition Unit and Third Storage Unit (Area Definition Condition Candidate Information Acquisition Unit and Area Definition Condition Candidate Information Storage Unit)

As the second embodiment, the third acquisition unit 424 acquires at least one piece of condition candidate information from the third storage unit 424 on demand from the selection unit 411 and the fifth creation unit 414, for instance. Furthermore, as the second embodiment, the third storage unit 404 is a storage for storing at least one piece of condition candidate information. The condition candidate information is information including at least one piece of condition information.

As the second embodiment, the condition information is information including a piece of area starting point event identification information and a piece of area ending point event identification information. The area starting point event identification information is information for specifying an area starting point event specified from a plurality of pieces of the event information based on the attribute information. The area starting point event is an event with a minimum execution start time within a specific area in the direction of the timeline axis, for instance. The area ending point event identification information is information for specifying an area ending point event specified from the plurality of pieces of the event information based on the attribute information. The area ending event is an event with a maximum execution ending time within the specific area in the direction of the timeline axis.

The condition information may be information preset in the system, information inputted by a programmer, or information generated based on the event information 1701.

In the third embodiment, the condition candidate information list 1901 explained using FIG. 19 in the second embodiment is used. Conditions about timeline information and execution term information can also be the same with the conditions exampled in the second embodiment.

Fifth Creation Unit (Hint Object Creation Unit)

As the second embodiment, the fifth creation unit 414 inputs the condition candidate information acquired by the third acquisition unit 424 from the third storage unit 404, and creates a hint object representing condition information for specifying an event based on the inputted condition candidate information. An example of a created hint object can be the same as the hint object 2001 shown in FIG. 20.

Selection Unit (Area Definition Condition Acquisition Unit)

As the second embodiment, the selection unit 411 inputs the condition candidate information acquired by the third acquisition unit 424 from the third storage unit 404, and selects at least one piece of condition information from the inputted condition candidate information. Also in the third embodiment, the case where the condition information corresponding to the items "EVENT BELONGING TO LoopA" 2002 and "iteration EVENT OF LoopA" 2003 is selected by a user will be explained as an example.

Update Unit (Area Definition Condition Information Update Unit)

As the second embodiment, the update unit 412 updates a condition information list 2101 stored in the fourth storage unit 405 based on at least one piece of condition information selected from among the condition candidate information by the selection unit 411. Therefore, in the third embodiment, as the second embodiment, the condition information list 2901 stored in the fourth storage unit 405 is updated using condition information of "EVENT BELONGING TO LoopA" 1902 and "iteration EVENT OF LoopA".

Fourth Acquisition Unit and Fourth Storage Unit (Area Information Definition Condition Information Acquisition Unit and Area Definition Condition Information Storage Unit)

The fourth acquisition unit 425 acquires at least one piece of condition information from the fourth storage unit 405 on demand from the fourth creation unit 413, for instance. The fourth storage unit 405 is a storage for storing at least one piece of condition information. FIG. 29 shows an example of a condition information list 2901 stored in the fourth storage unit 405. As shown in FIG. 29, an updated condition information list 2901 includes the condition information of "EVENT BELONGING TO iteration1 OF LoopA" 2902, "EVENT BELONGING TO iteration2 OF LoopA" 2903 and "EVENT BELONGING TO iteration3 OF LoopA" 2904.

Fourth Creation Unit (Area Information Creation Unit)

As the second embodiment, the fourth creation unit 413 inputs the event information list 1701 acquired by the first acquition unit 422 from the first storage unit 402, inputs the condition information 2101 acquired by the fourth acquisition unit 425 from the fourth storage unit 405, decides an area name, and selects one or more pieces of event information based on the condition information. Then, the fourth creation unit 413 decides an area from the selected event information, decides area execution sequence information based on the selected event information, and creates an area information. The area information is information defining an area in the direction of the timeline axis, and includes information for identifying at least an area and the area term information. For example, the information for identifying an area may be an area name or an ID inherent in an area.

Example of Area Information

FIG. 30 shows an example of the area information. As shown in FIG. 30, area information 3001 includes an area name, area timeline information and area attribute information for every area item 3002 to 3004. The area timeline information is information including at least area starting point execution sequence information and area ending point execution sequence information. The area name is information which is to be a label of the area to be displayed on the system. The area term information is information for defining an area in the direction of the timeline axis. The area attribute information is information depending on attribute information of event included in an area.

For example, the item 3002 is information in which the area name is "EVENT BELONGING TO iteration) OF LoopA", the area starting point execution sequence information is "1", and the area ending point execution sequence information is "3". Therefore, the area attribute information of the area information 3002 is execution term "1000" included in the area. The area attribute information is a summation of execution terms "500", "200" and "300" of events 2704, 2705 and 2706 included in the area corresponding to the area information 3002.

As the second embodiment, the area timeline information is applicable as long as it is information for defining an area in the direction of the timeline axis, and it is not limited to information including at least the area starting point execution sequence information and the area ending point execution sequence information while it also can be information including at least the area starting point execution sequence information and area term information indicating a width of the area in the direction of the timeline axis.

The area attribute information is set information of attribute information of events included in an area, and for instance, it may be a summation of execution terms, information about processor core executing an event included in an area, command information executing an event included in an area, memory access information executed by an event included in an area, the number of function calls executed by an event included in an area, a variable value in an event included in an area, iteration information indicating an iteration count when an event included in an area is a loop iteration, position information of an event included in an area on a source code, program structure information of an event included in an area, compilation information of a source code, version information of a source code of an event included in an area, information indicating whether a program of an event included in an area is a kernel program or not, or information indicating whether a program of an event included in an area is a user program or not.

The execution environment information of program is information about environment of execution of a program, and for instance, it may be a processor core name, a server name, or specification information about a server.

Here, as the second embodiment, an example in that a range where two or more selected events are successive is defined as a single area will be explained. When the event information 2704, 2705 and 2706 which have "LoopA:iteration" as a structure, respectively and each of which iteration count of LoopA is "1" are selected based on the program structure information and information indicating iteration count in the event information, because the program structure information in the event information 2705 is "function0: LoopA:iteration:LoopB:iteration:taskA" and the iteration count of LoopA is "1", it is possible to determine that an event indicated by the event information 2703 belongs to "iteration1 OF LoopA". The fourth creation unit 413 decides an area. In the example, because a range where successive events continue is defined as a single area, a term in which the events 2704, 2705 and 2706 are executed is defined as a single area.

Then, the fourth creation unit 413 decides an area starting point execution sequence information based on a magnitude relation of the execution sequence information in the selected event information. Because the execution sequence information in the selected event information are "1", "2" and "3", "1" being a minimum execution sequence is defined as the area starting point execution sequence information.

Then, the fourth creation unit 413 decides an area ending point execution sequence based on the magnitude relation of the execution sequence information in the selected event information. Because the execution sequence information in the selected event information are "1", "2" and "3", "3" being a maximum execution sequence is defined as the area ending point execution sequence information.

Then, the fourth creation unit 413 decides an area name "EVENT BELONGING TO iteration1 OF LoopA" based on the condition information. After that, the fourth creation unit 413 creates area information 3002 in which the area name is "EVENT BELONGING TO iteration1 OF LoopA", an area starting point execution sequence is "1", an area ending point execution sequence is "3" and an area attribute information indicating a summation of execution term of events included in the area is "1000", and stores the area information 3002 in the fifth storage unit 406.

Methods of deciding area, area starting point execution sequence information and area ending point execution sequence information, creation of area timeline information when a single event selected based on condition information is defined as a single area, and creation of region name can be the same as those in the second embodiment.

Fifth Acquisition Unit and Fifth Storage Unit (Area Information Acquisition Unit and Area Information Storage Unit)

As the second embodiment, the fifth acquisition unit 426 acquires at least one piece of area information from the fifth storage unit 406 on demand from the third creation unit 409, for instance. Furthermore, as the second embodiment, the fifth storage unit 406 is a storage for storing at least one piece of area information.

Third Creation Unit (Area Object Creation Unit)

As the second embodiment, the third creation unit 409 inputs the axis information acquired by the second acquisition unit 423 from the second storage unit 403, inputs the area information acquired by fifth acquisition unit 426 from the fifth storage unit 406, and decides a starting point coordinate and an ending point coordinate indicating a display positions and a display range of an area object representing areas in the direction of the timeline axis based on the timeline axis information in the axis information and the area timeline information in the area information. The third creation unit 409 decides at least a starting point coordinate and an ending point coordinate of the area object to be displayed on a screen based on area timeline information in all the area information stored in the fifth storage unit 406. On this occasion, the third creation unit 409 determines whether an overlap area exists in the direction of the timeline axis, and when there is overlap area, the third creation unit 409 decides different coordinates indicating display positions in the direction of the attribute axis so that appropriate area objects do not overlap with each other in the direction of the attribute axis. Furthermore, in the third embodiment, because an area object is a rectangular object, the third creation unit 409 decides different display ranges in the direction of the attribute axis so that appropriate area objects do not overlap with each other in the direction of the attribute axis. After that, the third creation unit 409 creates area objects each of which includes a starting point coordinate and an ending point coordinate indicating a display position in the direction of the timeline axis, a display range in the direction of the timeline axis, a coordinate indicating a display position in the direction of the attribute axis, a display range in the direction of the attribute axis, and an area name of area information.

The creation of area object by the third creation unit 409 will be explained while focusing the area information 3002. Firstly, the third creation unit 409 calculates "1÷1=1" based on the information "NUMBER OF EXECUTION SEQUENCE INFORMATION PER DISPLAY PITCH IS 1" being the timeline axis information 2802 in the axis information 2801 and the area starting point execution sequence information "1" of the area of the area information 3002 using the formula for the starting point coordinate indicating the display position in the direction of the timeline axis "(AREA STARTING POINT EXECUTION SEQUENCE INFORMATION)÷(NUMBER OF EXECUTION SEQUENCE INFORMATION PER DISPLAY PITCH)", and calculates "3÷1=3" using the formula for the display size in the direction of the timeline axis "(NUMBER OF EXECUTION SEQUENCE INFORMATION INCLUDED IN AREA STARTING POINT EXECUTION SEQUENCE INFORMATION AND AREA ENDING POINT EXECUTION INFORMATION)÷(NUMBER OF EXECUTION SEQUENCE INFORMATION PER DISPLAY PITCH)". Furthermore, the third creation unit 409 decides an ending point coordinate as "4" based on the starting point coordinate and the display size. Furthermore, the third creation unit 409 decides a coordinate indicating a display position in the direction of the attribute axis based on a screen size.

Then, the third creation unit 409 decides display ranges in the direction of the attribute axis based on the area attribute information indicating execution term of the area corresponding to the area information 3002 and the area object attribute axis information 2809, 2810 and 2811 in the axis information 2801. For example, because at least the display range in the direction of the attribute axis includes the display starting point information and the display ending point information in the direction of the attribute axis, the display starting point information in the direction of the attribute axis is decided as "0" based on the area object attribute axis information 2809 indicating the execution term "0" of the area. Furthermore, the display ending point information in the direction of the attribute axis is decided as the display ending information "600" in the direction of the attribute axis based on the area attribute information "1000" indicating the execution term of the area and the area object attribute axis element information 2811 corresponding to "1000". Then, the third creation unit 409 defines an area name as "EVENT BELONGING TO iteration1 OF LoopA" based on the area name in the area information 3002. After that, the third creation unit 409 creates an area object including information about the starting point coordinate and the ending point coordinate indicating the display position and the display range in the direction of the timeline axis, the coordinate indicating the display position and the display range in the direction of the attribute axis, and the area name.

Here, as the second embodiment, the area object is applicable as long as it is an object representing an area in the direction of the timeline axis, and for instance, it may be a line object, a rectangular object, or another object representing an area.

Display Unit

As the second embodiment, the display unit 410 displays the axis objects, the event objects, the hint object and the area objects. In the following, an operation of the display unit 410 will be explained using an example of a program execution status display region 3101 after selection of the condition information shown in FIG. 31. In this explanation, a case where a displayable region is displayed on a screen and a display region can be shifted using a scroll bar will be exampled.

Display Axis Object

The display unit 410 inputs the axis objects from the second creation unit 408, and displays the axis objects based on the display information added to the axis objects. Among the axis objects, the timeline axis object displays labels of execution sequence information by a constant interval, and the attribute axis object displays attribute labels. In the example shown in FIG. 31, a timeline axis displays from "1" to "9", for instance. It is applicable that the display unit 410 may display axis objects with displayable sizes depending on an inputted display size such as a screen size or a window size, and it is also applicable that the display unit 410 may expand or minify sizes of the axis objects to displayable sizes depending on the inputted display size.

Display Event Object

Figure 31:
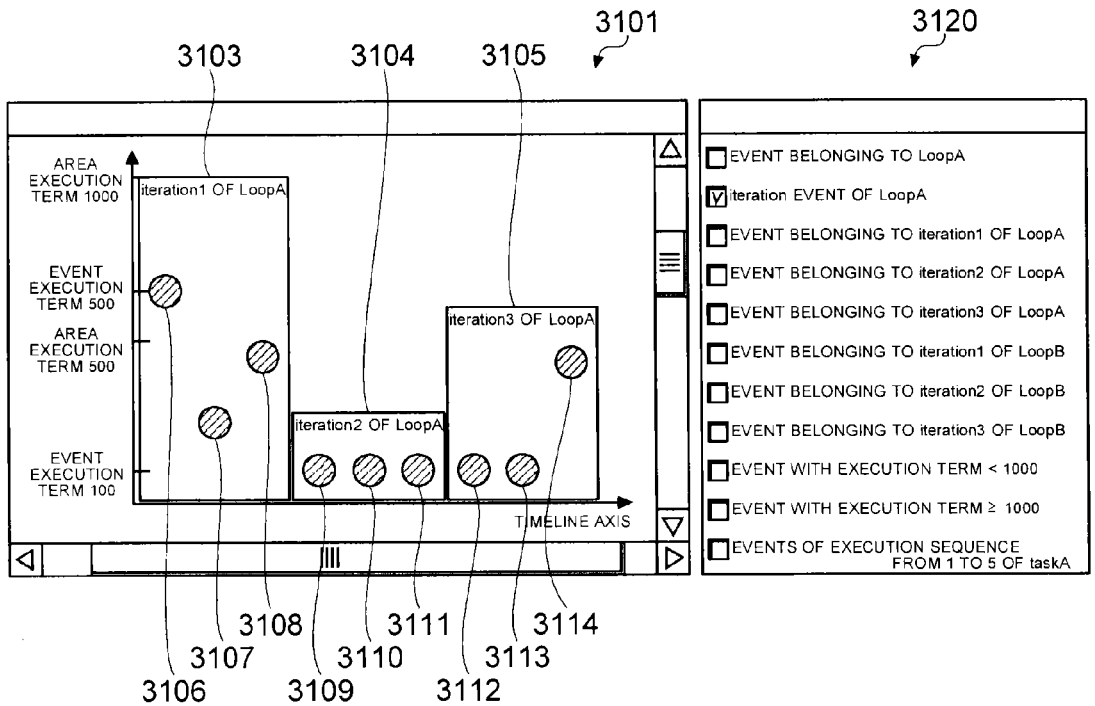
FIG. 31 is a diagram showing an display example of a program execution status after selecting condition according to the third embodiment.

The display unit 410 inputs the event objects from the first creation unit 407, and draws the event objects on a screen based on the starting point coordinate and the ending point coordinate indicating the display position added to the event objects. As shown in FIG. 31, in this example, event objects representing the events 2704, 2705, 2706, 2708, 2709, 2710, 2712, 2713 and 2714 are displayed as event objects 3106 to 3114 in this order. It is applicable that the display unit 410 may display event objects with displayable sizes depending on the inputted display size such as a screen size or a window size, and it is also applicable that the display unit 410 may expand or minify sizes of the event objects to displayable sizes depending on the inputted display size.

Display Hint Object

The display unit 410 inputs the hint object from the fifth creation unit 414, and draws the hint object 3120 on the screen based on the coordinate indicating the display position added to the hint object. As shown in FIG. 31, the hint object 3120 may be displayed as a window different from the program execution status display region 3101 displaying the event objects. The hint object 3120 can be normally displayed or be displayed on demand from a user.

Display Area Object

The display unit 410 inputs the area objects from the third creation unit 409, and draws the area objects 3103 to 3105 on the screen based on the starting point coordinate and the ending point coordinate indicating the display position added to the area objects. Furthermore, the display unit 410 displays area names based on the area names added to the area objects 3103 to 3105. The program execution status display region 3101 shown in FIG. 31 is a display example after selection of the area definition condition. Because the area definition conditions of "iteration EVENT OF LoopA" is selected in the hint object 3120, on the program execution status display region 3101, an area object 3103 indicating "EVENT BELONGING TO iteration1 OF LoopA", an area object 3104 indicating "EVENT BELONGING TO iteration2 OF LoopA" and an area object 3105 indicating "EVENT BELONGING TO iteration3 OF LoopA" are displayed.

As the second embodiment, any display object can be used for an area object as long as an object representing a range including a starting point and an ending point of an area.

When at least a part of area objects is overlapped, the area objects can be displayed as long as each area object can be identified each other.

As described above, according to the third embodiment, it is possible to effectively display a program executing status including massive events to a user. Furthermore, by displaying a hint object together with the program execution status, it is possible to display the program execution status interactively and effectively. The other configurations, operations and effects may be the same as the other embodiments.

Fourth Embodiment

Next, a data processing system, a method and a program product of creating program information, and a program information display system according to a fourth embodiment will be described in detail with accompanying drawings. In the fourth embodiment, a case where an area has a display range (plot version) in the direction of the attribute axis will be explained as an example.

In the fourth embodiment, as the third embodiment, the case where a plurality of events are displayed at one time by displaying an event "LoopA" 2403 and events "LoopB" 2404, 2405 and 2406 so that they have range information in the direction of the timeline axis while displaying event "taskA" 2402 when the program 1301 shown in FIG. 13 is executed, as shown in FIG. 24.

A program execution status display system according to the fourth embodiment can have the same configuration as the system 401 (see FIG. 4) exampled in the first embodiment. Operation of the program execution status display system according to the fourth embodiment can be the same operation (see FIG. 5) exampled in the first embodiment. Therefore, as the configuration and the operation of the program execution status display system according to the fourth embodiment, by referencing the explanations using FIGS. 4 and 5, the redundant explanations thereof will be omitted. Structures of units in the program execution status display system according to the fourth embodiment will be the followings.

In the fourth embodiment, the first acquisition unit 422, the second acquisition unit 423, the third acquisition unit 424, the fourth acquisition unit 425, the fifth acquisition unit 426, the first storage unit 402, the second storage unit 403, the second creation unit 408, the first creation unit 407, the third storage unit 404, the fifth creation unit 414, the selection unit 411, the update unit 412, the fourth storage unit 405, the fourth creation unit 413, the fifth storage unit 406 the third creation unit 409, the display unit 410 and the input unit 415 can be the same as those in the third embodiment.

In the fourth embodiment, an execution example (FIG. 13) of the program 1301, event information, event specific information, event timeline information, event execution term information, an execution start time, an execution ending time and an execution term, event execution sequence information, attribute information, execution trace information, static information of program, execution environment information of program, axis information, timeline axis information, attribute axis information, display attribute identification information, event object attribute axis information and an element name of the event object attribute axes, coordinates indicating display positions, area object attribute axis information and an element name of the area object attribute axes, an attribute axis object, condition candidate information, condition information, condition about timeline information of event, condition about execution term information, condition about attribute information, a user interface (hint object), area information, an area name, area timeline information, area attribute information, an area, a method of deciding area starting point execution sequence information, a method of deciding area ending point execution sequence information, creation of area timeline information in a case where a single event selected based on condition information, creation of an area name, and a display size of an area object in a direction of an attribute axis can be the same as those in the third embodiment.

However, in the fourth embodiment, the area object created by the third creation unit 409 is changed from a rectangular object (see FIG. 31) into an ellipsoidal object. Therefore, a program execution status display region displayed on the display unit 410 becomes as shown in FIG. 32.

Display Axis Object, Event Object and Hint Object

Figure 32:
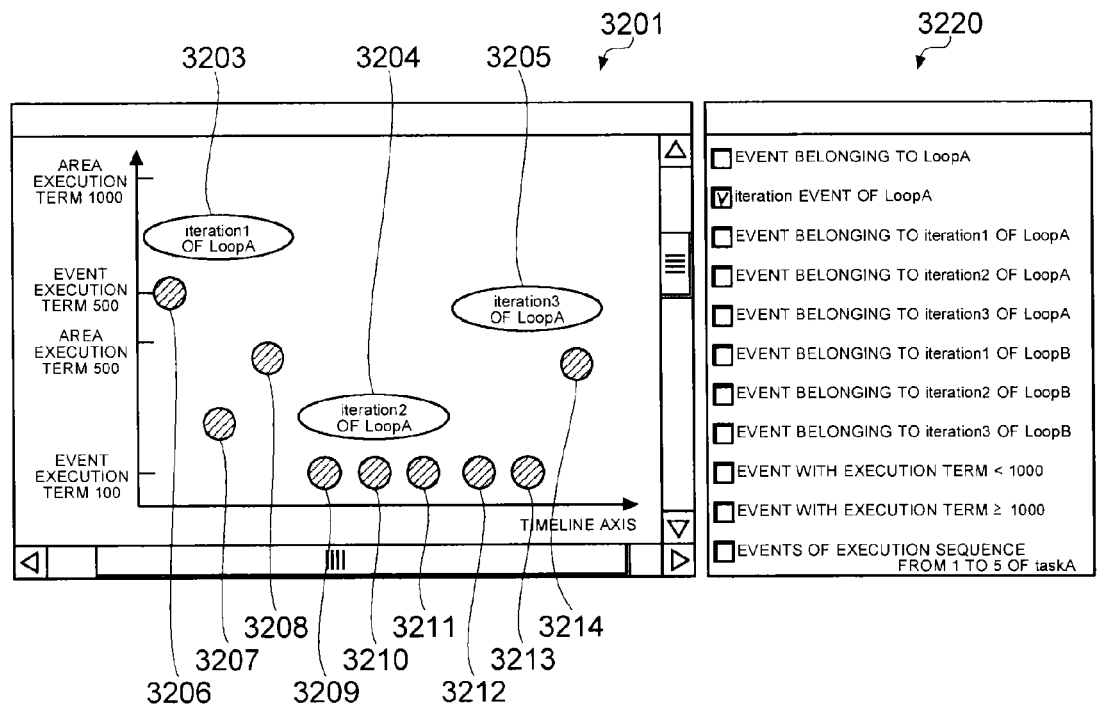
FIG. 32 is a diagram showing an display example of a program execution status after selecting condition according to a fourth embodiment.

As shown in FIG. 32, as the third embodiment, the program execution status display region 3201 according to the fourth embodiment is drawn by the display unit 410 inputting the axis objects from the second creation unit 408, inputting the event objects from the first creation unit 407, inputting the hint object from the fifth creation unit 414, and drawing the axis objects, the event objects and the hint object on a screen based on the coordinate indicating the display position added to each objects.

Display Area Object

The display unit 410 inputs the area objects from the third creation unit 409, and draws the area objects 3203 to 3205 on the screen based on the starting point coordinate and the ending point coordinate indicating the display position added to the area objects. Furthermore, the display unit 410 displays area names based on the area names added to the area objects 3203 to 3205. As a result, in the fourth embodiment, because ellipsoidal objects are created as the area objects 3203 to 3205, as shown in FIG. 32, the ellipsoidal area objects 3203 to 3205 are displayed on the region 3201.

Contrary to the third embodiment, there is no need for the area objects 3203 to 3205 to include corresponding event objects 3206 to 3214, respectively. That is, the area objects 3203 to 3205 can be displayed in any way as long as a user can discriminate an event object corresponding to each of the area objects 3203 to 3205 by viewing. This is the same for the above-described embodiments.

As described above, according to the fourth embodiment, it is possible to effectively display a program executing status including massive events to a user. Furthermore, by displaying a hint object together with the program execution status, it is possible to display the program execution status interactively and effectively. The other configurations, operations and effects may be the same as the other embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processing system comprising:
   at least one computer processor;
   at least one storage;
   a first acquisition unit that is it by the at least one computer processor and configured to acquire event information including timeline information about an execution time or an execution order of at least one event, the event information stored in the at least one storage;
   a second acquisition unit that is implementer by the at least one computer processor and configured to acquire axis information including first axis information for deciding an first coordinate axis of a timeline about the execution time or the execution order of the event, the axis information stored in the at least one storage;
   a third acquisition unit that is implemented by the at least one computer processor and configured to acquire event specific information for specifying the event information, the event specific information stored in the at least one storage;
   a first creation unit that is implemented by the at least one computer processor and configured to create a first axis object representing the first coordinate axis bases on the axis information; and
   a second creation unit that is implemented by the at least one computer processor and configured to, for every event information specified by the event specific information, decide a coordinate of the event on the first coordinate axis based on the timeline information and the first axis information, decide a starting point coordinate and an ending point coordinate of an area corresponding to the event specified by the event information based on a decided coordinate of the event, and create an area object representing the area defined by the starting point coordinate and the ending point coordinate; and
   a third creation unit that is implemented by the at least one computer processor and configured to create an event object representing an execution result of the event, wherein the event information further includes event attribute information about an attribute of the event,
   the axis information further includes second axis information for deciding a second coordinate axis about the attribute of the event,
   the second creation unit is further configured to create a second axis object representing the second coordinate axis based on the second axis information, and the third creation unit is further configured to:
   decide a coordinate of the event object on the first coordinate axis based on the timeline information and the first axis information, and
   decide a coordinate of the event object on the second coordinate axis based on the event attribute information and the second axis information.

2. The system according to claim 1, wherein the second creation unit further configured to decide the starting point coordinate based on a minimum coordinate among coordinates of events decided by the second creation unit, and decide the ending point coordinate based on a maximum coordinate among the coordinates of the events decided by the second creation unit.

3. The system according to claim 1, wherein the event information includes first event information including timeline information about a first event and second event information including timeline information about a second event, the event specific information includes first event specific information for specifying the first event information and second event specific information for specifying the second event information, and the second creation unit is further configured to:
   decide a coordinate of the first event on the first coordinate axis based on the timeline information of the first event specified by the first event specific information and the first axis information, decide a coordinate of the second event on the first coordinate axis based on the timeline information of the second event specified by the second event specific information and the first axis information, decide the starting point coordinate based on the decided coordinate of the first event on the first coordinate axis and a minimum coordinate among the decided coordinates of the second event on the first coordinate axis, and decide the ending point coordinate based on the decided coordinate of the first event on the first coordinate axis and a maximum coordinate among the decided coordinates of the second event on the first coordinate axis.

4. The system according to claim 3, wherein the timeline information further induces event stalling point information indicating an execution start time of the first event and an execution start time of the second event, and event ending point information indicating an execution ending time of the first event and an execution ending time of the second event, the third creation unit is further configured to:

decide a first starting point coordinate and a first ending point coordinate of the first event on the first coordinate axis and a second starting point coordinate and a second ending point coordinate of the second event on the first coordinate axis based on the event starting point information and the first axis information, and create a first event object representing an execution result of the first event and a second event object representing an execution result of the second event based on the first starting point coordinate, the first ending point coordinate, the second starting point coordinate and the second ending point coordinate, and the second creation unit is further configured to:

decide the starting point coordinate of the area based on the first starting point coordinate and the second starting point coordinate, decide the ending point coordinate of the area based on the first ending point coordinate and the second ending point coordinate, and create the area object.

5. The system according to claim 4, further comprising:
a fourth acquisition unit configured to acquire a selection condition including attribute selection information for specifying the event attribute information about the event information; and
a fourth creation unit configured to create the event specific information,
wherein the fourth creation unit is further configured to create the event specific information corresponding to at least one area based on the selection condition.

6. The system according to claim 4, further comprising:
a fifth creation unit configured to create a hint object being a user interface for making user select the event attribute information about the event information,
wherein the fourth acquisition unit is further configured to acquire the event attribute information about at least one piece of event information selected via the hint object as the selection condition.

7. The system according to claim 4, wherein
the area information further includes area attribute information about attribute of a plurality of events included in the area, and
the second creation unit is further configured to create the area object representing the area attribute information of each area.

8. The system according to claim 4, wherein the second creation unit is further configured to create, with respect to two different area objects, when a starting point coordinate of a second area object is located between a starting point coordinate and an ending point coordinate about a first area object, the first area object and the second area object so that the first area object is located at a position different from a position where the second area object is located.

9. The system according to claim 4, wherein
the area information further includes area attribute information about the event attribute information about a plurality of events included in each area,
the second axis information includes event attribute axis information indicating the event attribute information and area attribute axis information indicating the area attribute information,
the second creation unit is further configured to create the area objet with the area attribute information, and
the second axis object includes an event attribute axis object representing the event attribute information and an area attribute axis object representing the area attribute information.

10. A program information display system comprising:
the data processing system according to claim 1; and
a display configured to visualize the program information by arranging the area object on a coordinate system represented by the axis object.

11. A method for creating program information including a plurality of events, the method including:
acquiring event information including timeline information about an execution time or an execution order of at least one event;
acquiring axis information including first axis information for deciding an first coordinate axis of a timeline about the execution time or the execution order of the event;
acquiring event specific information for specifying the event information;
creating a first axis object representing the first coordinate axis based on the axis information; and
for every event information specified by the event specific information, deciding a coordinate of the event on the first coordinate axis based on the timeline information and the first axis information;
deciding a starting point coordinate and an ending point coordinate of an area corresponding to the event specified by the event information based on a decided coordinate of the event,
creating an area object representing the area defined by the starting point coordinate and the ending point coordinate; and
creating an event object representing an execution result of the event, wherein
the event information further includes event attribute information about an attribute of the event,
the axis information further includes second axis information for deciding a second coordinate axis about the attribute of the event, and
the method further includes:
creating a second axis object representing the second coordinate axis based on the second axis information,
deciding a coordinate of the event object on the first coordinate axis based on the timeline information and the first axis information, and
deciding a coordinate of the event object on the second coordinate axis based on the event attribute information and the second axis information.

12. A non-transitory computer readable program product storing instructions for letting a computer processor create program information including a plurality of events, the instructions including:
- acquiring event information including timeline information about an execution time or an execution order of at least one event;
- acquiring axis information including first axis information for deciding an first coordinate axis of a timeline about the execution time or the execution order of the event;
- acquiring event specific information for specifying the event information;
- creating a first axis object representing the first coordinate axis based on the axis information; and
- for every event information specified by the event specific information, deciding a coordinate of the event on the first coordinate axis based on the timeline information and the first axis information;
- deciding a starting point coordinate and an ending point coordinate of an area corresponding to the event specified by the event information based on a decided coordinate of the event,
- creating an area object representing the area defined by the starting point coordinate and the ending point coordinate; and
- creating an event object representing an execution result of the event, wherein the event information further includes event attribute information about an attribute of the event, the axis information further includes second axis information for deciding a second coordinate axis about the attribute of the event, and the instructions further include:
- creating a second axis object representing the second coordinate axis based on the second axis information,
- deciding a coordinate of the event object on the first coordinate axis based on the timeline information and the first axis information, and
- deciding a coordinate of the event object on the second coordinate axis based on the event attribute information and the second axis information.

* * * * *